(12) United States Patent
Crockett et al.

(10) Patent No.: US 7,965,829 B2
(45) Date of Patent: Jun. 21, 2011

(54) SUBSCRIBER ALTERABLE CALL TRANSFER SERVICE

(75) Inventors: Susanne M. Crockett, Buffalo Grove, IL (US); Robert B. Lasken, Schaumburg, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1560 days.

(21) Appl. No.: 11/191,342

(22) Filed: Jul. 27, 2005

(65) Prior Publication Data

US 2006/0023859 A1 Feb. 2, 2006

Related U.S. Application Data

(60) Provisional application No. 60/592,706, filed on Jul. 30, 2004.

(51) Int. Cl.
*H04M 3/42* (2006.01)
(52) U.S. Cl. ............... 379/211.02; 379/211.01
(58) Field of Classification Search ............ 379/211.02, 379/211.01, 221.01, 216.01
See application file for complete search history.

(56) References Cited

U.S. PATENT DOCUMENTS

| | | | |
|---|---|---|---|
| 4,788,719 A | | 11/1988 | Gupta |
| 5,291,550 A | | 3/1994 | Levy et al. |
| 5,432,845 A | | 7/1995 | Burd et al. |
| 5,590,186 A | | 12/1996 | Liao et al. |
| 5,617,471 A | | 4/1997 | Rogers et al. |
| 5,850,432 A | | 12/1998 | Desai et al. |
| 6,104,799 A | * | 8/2000 | Jain et al. ................. 379/211.01 |
| 6,163,597 A | * | 12/2000 | Voit ........................... 379/93.17 |
| 6,212,264 B1 | | 4/2001 | Kim |
| 6,212,383 B1 | | 4/2001 | Foladare et al. |
| 6,298,127 B1 | | 10/2001 | Petrunka |
| 6,349,299 B1 | * | 2/2002 | Spencer et al. .................. 707/10 |
| 6,611,498 B1 | | 8/2003 | Baker et al. |
| 6,678,714 B1 | * | 1/2004 | Olapurath et al. ............ 718/104 |
| 6,735,298 B2 | | 5/2004 | Neyman et al. |
| 6,744,858 B1 | * | 6/2004 | Ryan et al. ....................... 379/45 |
| 6,768,793 B1 | | 7/2004 | Sbisa et al. |
| 6,980,636 B2 | * | 12/2005 | Fleischer et al. ......... 379/211.02 |
| 7,050,810 B2 | * | 5/2006 | Brusilovsky et al. ......... 455/445 |
| 2002/0073207 A1 | | 6/2002 | Widger et al. |
| 2002/0085517 A1 | * | 7/2002 | Lee et al. ...................... 370/331 |
| 2003/0005150 A1 | | 1/2003 | Thompson et al. |
| 2003/0016812 A1 | | 1/2003 | Rodenbusch et al. |
| 2003/0187988 A1 | | 10/2003 | Lee et al. |
| 2003/0224795 A1 | | 12/2003 | Wilhoite et al. |
| 2003/0228011 A1 | | 12/2003 | Gibson |
| 2003/0235283 A1 | * | 12/2003 | Knoerle et al. .......... 379/215.01 |
| 2004/0111269 A1 | | 6/2004 | Koch |

* cited by examiner

*Primary Examiner* — William J Deane
(74) *Attorney, Agent, or Firm* — Jackson Walker L.L.P.

(57) ABSTRACT

A method and system are provided for implementing a call transfer service over a telephone network, a subscription for the call transfer service being alterable by a call transfer service subscriber, and includes a subscriber graphic user interface through which the subscriber may provide call transfer service information. A telephone network node such as a platform may further be provided, the platform in communication with the subscriber graphic user interface, and including a memory device that stores call transfer service information for use in implementing the call transfer service. The platform further includes a call transfer service controller coupled with the memory device, that communicates with the subscriber graphic user interface, and that receives call transfer service information, and updates the subscriber's call transfer service subscription responsive to information received at the graphic user interface.

28 Claims, 14 Drawing Sheets

500

© 2003 SBC Properties L.P.

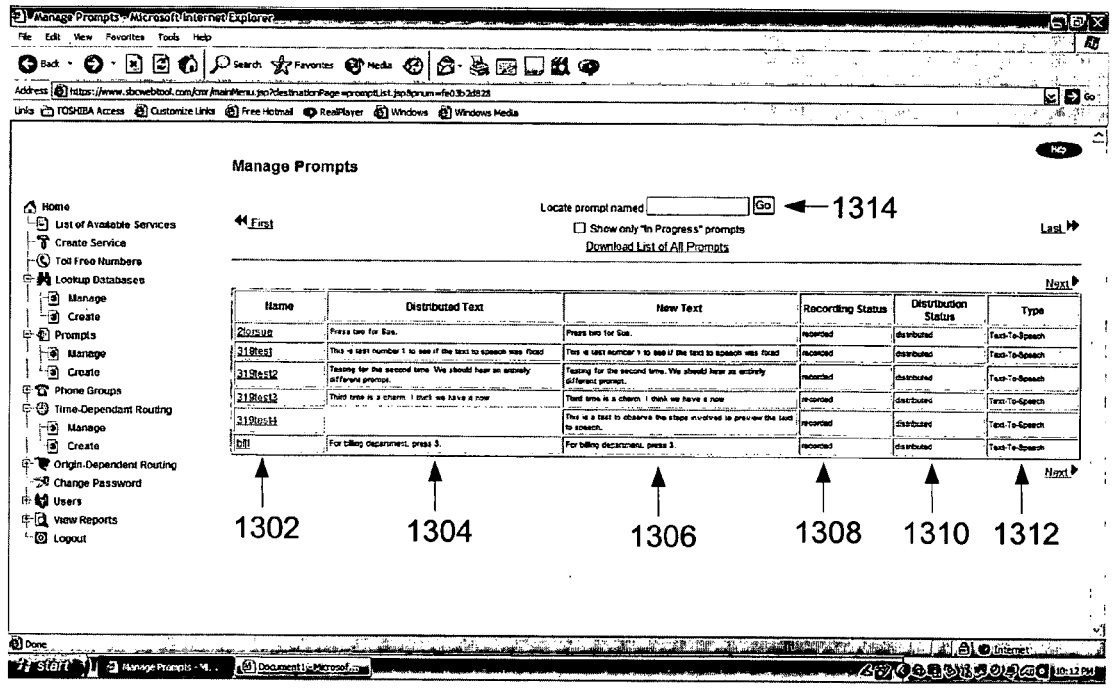
© 2003 SBC Properties L.P.    Figure 13    1300
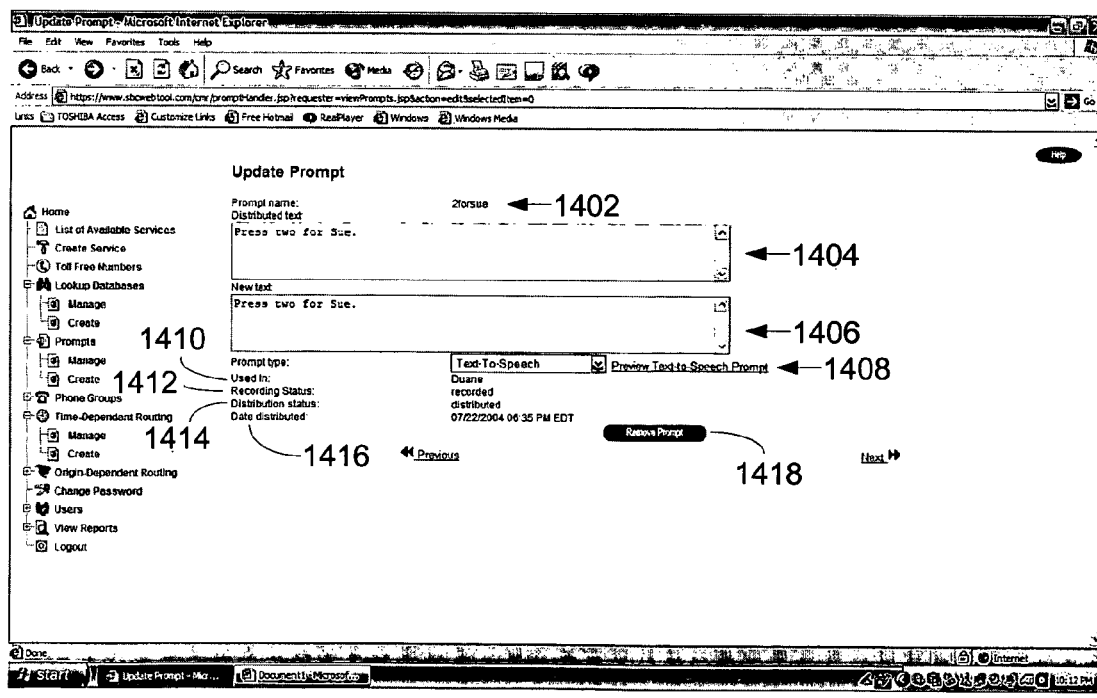
© 2003 SBC Properties L.P.    Figure 14    1400

SUBSCRIBER ALTERABLE CALL TRANSFER SERVICE

CROSS-REFERENCE TO RELATED APPLICATIONS

This patent document claims the benefit of the filing date under 35 U.S.C. §119(e) of Provisional U.S. Patent Application Ser. No. 60/592,706, entitled "Subscriber Alterable Call Transfer Service" to Crockett et al., that was filed on Jul. 30, 2004, and is hereby incorporated by reference herein.

TECHNICAL FIELD

This invention is directed to a service provided over the telephone network, and more particularly, to a subscriber alterable call transfer service provided over the telephone network.

BACKGROUND ART

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A call transfer services may be utilized, for example, by a company (i.e., a manufacturing company, insurance provider, etc. . . . ), in transferring or conferencing received telephone calls associated with a particular telephone number, such as the companies toll-free telephone number, to a telephone number external to the particular company branch location.

Where a company has numerous company locations, it may be necessary for a company operator or an interactive voice response unit (IVR) handling telephone calls for the company location to transfer or conference a call external to the company (i.e. to another company location). For example, the toll free number for a company may direct a calling party to a company location A, however, the customer service department for the company is located at company location B. In this circumstance, where it is indicated that the incoming call at company location A is to be transferred to or conferenced with another company location (i.e. to Location B), the IVR or company operator must place the incoming call on hold, access an additional incoming line to the company, and use the additional incoming line to connect to the new destination (i.e. telephone number to which the incoming call is to be transferred). The operator can then initiate the connection for the incoming line to the new destination. When doing this, two incoming lines to the company location are utilized to maintain the connection of the incoming call to the new destination, until the call is terminated. A call transfer service provided by the telephone company may be utilized such that a transfer or conference of an incoming call to an additional telephone number external to the company may be commenced using only a single incoming telephone line to the company, and after the transfer is commenced, the telephone network, and not the company, maintains the connection, thus freeing up the incoming lines at the company used to initiate the call transfer.

The call transfer service may be implemented as a call transfer service platform, for example, one or more computers/servers that may include switching and IVR capabilities to perform call transfer service functionality. The call transfer service platform is typically connected with a telephone service switching point (SSP). A telephone call initiated to a telephone number subscribing to the call transfer service is routed to the SSP, from the SSP through the platform and back to the SSP, and then to the call destination. By routing the calls through the platform (i.e. placing the platform into the call loop), the platform is able to monitor calls placed to a call transfer service subscriber telephone number for call transfer service commands. Call transfer service commands typically take the format of standardized 1 or 2 DTMF sequences indicating how a particular call to the telephone number is to be handled, for example, transferred or conferenced.

The DTMF sequence may be entered automatically by a IVR at the subscriber location in response to a caller selection, or by an operator at the subscriber location in response to a caller request. When the platform detects the DTMF sequence and telephone number to which the call is to be transferred or conferenced, the platform directs the switch to connect the call to the new destination telephone number (i.e. to which the transfer is desired), and releases the telephone line to the company, thus allowing a telephone call to be transferred to a new telephone number without tying-up the company incoming telephone lines.

To take advantage of a call transfer service, companies subscribe to the call transfer service from the local telephone company, where the call transfer service is associated with a telephone number (usually a toll-free number) for the company. Upon subscribing to the call transfer service, the company sets up a call-handling scheme describing potential actions/handling of a telephone call received at the associated telephone number with the help of the telephone company personnel.

Where the company employs a call transfer service from the local telephone company, telephone company personnel must receive detailed instructions from the company indicating when and how calls to the company premise are to be handled, for example, transferred, conferenced, and placed on hold. The telephone company personnel must then program the call transfer service platform to handle the company telephone number in the way directed by the company, using the standardized DTMF sequences that the platform understands.

Further, when a call-handling scheme must be modified, such as to change the telephone number to which a particular call must be transferred, or to add additional options to the call-handling scheme, the company must utilize telephone company personnel to make the changes to the call-handling scheme via a written change request to the telephone company. The detailed instructions or the change requests are often processed one or more days after they are received by the telephone company, and accordingly, leave the company with no call transfer service, or inaccurate call transfer service call-handling scheme information until the change request is processed.

This invention is directed to solving one or more of the problems discussed above.

BRIEF DESCRIPTION OF SEVERAL VIEWS OF THE DRAWINGS

FIGS. 12-14 illustrate exemplary subscriber GUIs allowing a subscriber to create or edit voice prompts that may be used in conjunction with a call transfer service, in accordance with an embodiment of the invention;

DETAILED DESCRIPTION OF THE PREFERRED EMBODIMENT

A method and system are provided for implementing a call transfer service over a telephone network, a subscription for the call transfer service being alterable by a call transfer service subscriber, and includes a subscriber graphic user interface (GUI) through which the subscriber may provide call transfer service information. A telephone network node, such as a platform, may further be provided, the platform in communication with the subscriber graphic user interface, and including a memory device that stores call transfer service information for use in implementing the call transfer service. The platform further includes a call transfer service controller coupled with the memory device, that communicates with the subscriber graphic user interface, and that receives call transfer service information, and updates the subscriber's call transfer service subscription responsive to information received at the subscriber graphic user interface.

Having a subscriber alterable call transfer service subscription allows a subscriber to create or modify a call transfer service subscription without the intervention of telephone company personnel. A subscriber may then create or modify the call transfer service subscription at any time of the day. Further, the call transfer service subscription may be created or modified in real-time, or near real-time, removing the necessity of waiting for a service subscription to be created or modified by the telephone company personnel. In addition, the subscriber is given the flexibility of defining attention signals and/or function signals to be used for gaining the attention of the platform, and for indicating a particular call handling command to be performed by the platform, rather than being restricted to standardized attention and function signals definitions.

Figure 1:
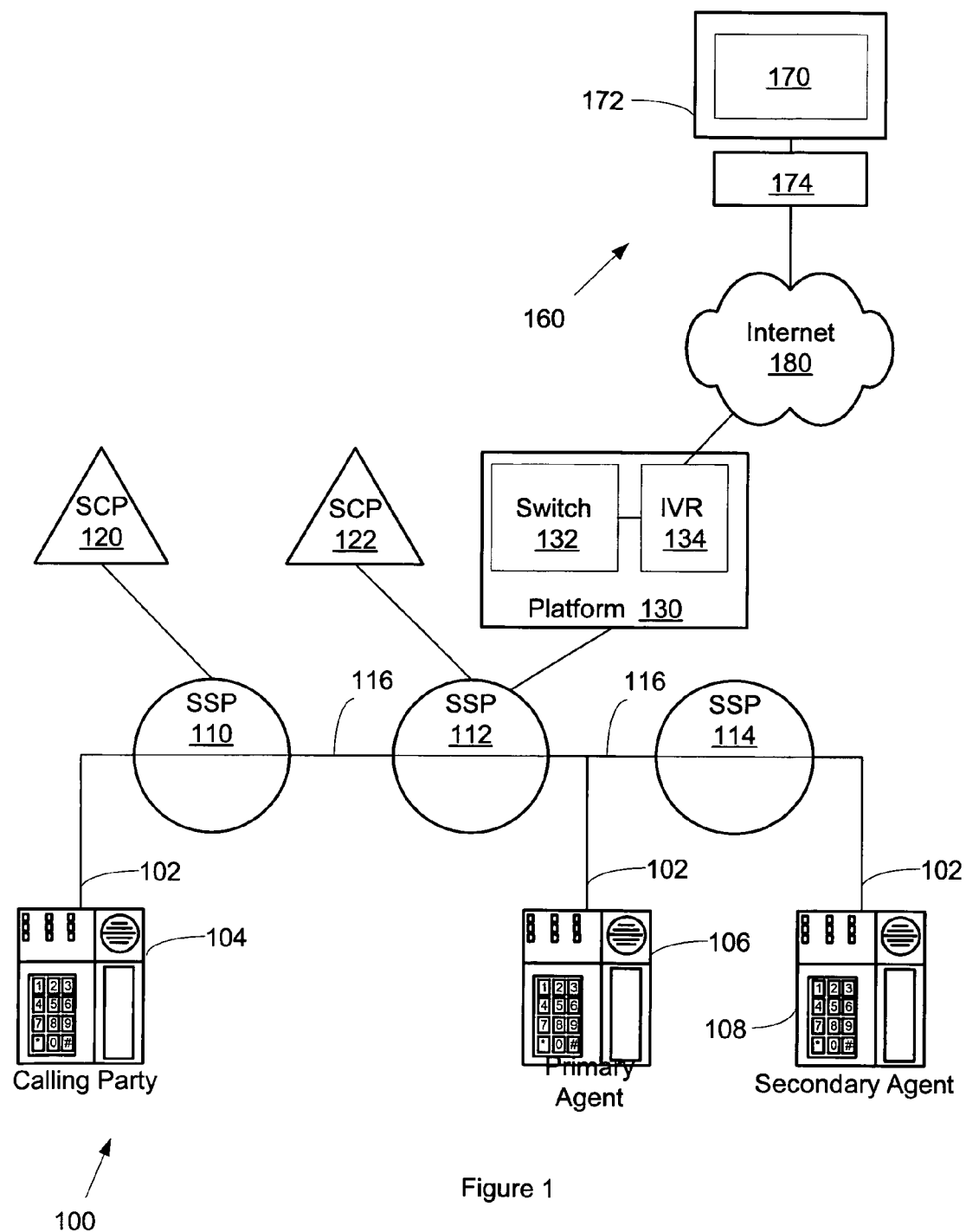
FIG. 1 is a block diagram of a telephone network over which a subscriber alterable call transfer service may be implemented, in accordance with an embodiment of the invention.

A block diagram of an exemplary telephone network 100 that may be used in providing a subscriber alterable call transfer service subscription is shown in FIG. 1, in accordance with an embodiment of the invention. As shown in FIG. 1, a plurality of telephone lines 102 are shown, connecting a plurality of telephone network locations 104, 106 and 108 via service switching points (SSPs) 110, 112 and 114 respectively. The SSPs 110, 112 and 114 are connected via trunked communications lines 116, which are used to connect and carry communications signals, for example, voice and/or data, between two or more of the telephone network locations 104, 106 and 108.

Service control points (SCPs) 120 and 122 may be coupled with SSPs 110 and 112, respectively, and provide advanced intelligent network (AIN) capabilities to the telephone network, as well as routing information to the SSPs of the telephone network describing how a telephone call from a calling party to a called party is to be routed. A telephone network node, here, a call transfer service platform 130, may be coupled with an SSP, for example, the SSP 112, and provides capabilities for a subscriber alterable call transfer service subscription, where a subscriber may provide call transfer service subscription information. The call transfer service subscription information may include, for example, an attention signal and/or a function signal definition, and may further include information regarding a destination signal definition, as well as any other call transfer service information that may be used at the platform 130 in implementing the functionality of the call transfer service, as will be described further below.

The call transfer service platform 130 may include switching and interactive voice response unit capabilities. For example, the platform may include a platform switch 132 (i.e. a platform SSP, for example, a switch manufactured by United States Advanced Networks (USAN)), capable of interfacing with an external SSP (i.e., the SSP 112) to receive incoming telephone calls from a calling party to the platform, and for initiating transfer and/or conferencing of the incoming call with an additional telephone number(s). The switch 132 may be coupled with an interactive voice response unit (IVR) 134 (for example, a IVR manufactured by USAN) that provides voice response capabilities for use in implementing the call transfer service, for example, for playing pre-recorded messages or performing text-to-speech reading of messages to a calling party, and for detecting attention, function, and/or destination signals, for example, in the form of DTMF tones entered by the subscribing party. A more detailed block diagram of the platform 130 will be discussed below, with respect to the block diagram of FIG. 2.

The IVR 134 may communicate with a subscriber host 160 to provide a subscriber GUI 170. The subscriber host 160 typically comprises a display 172 and a controller such as a computer 174, capable of displaying the call transfer service subscriber GUI 170 to the subscriber. The subscriber host 160 may communicate with the IVR 134, for example, via the Internet 180.

Figure 2:
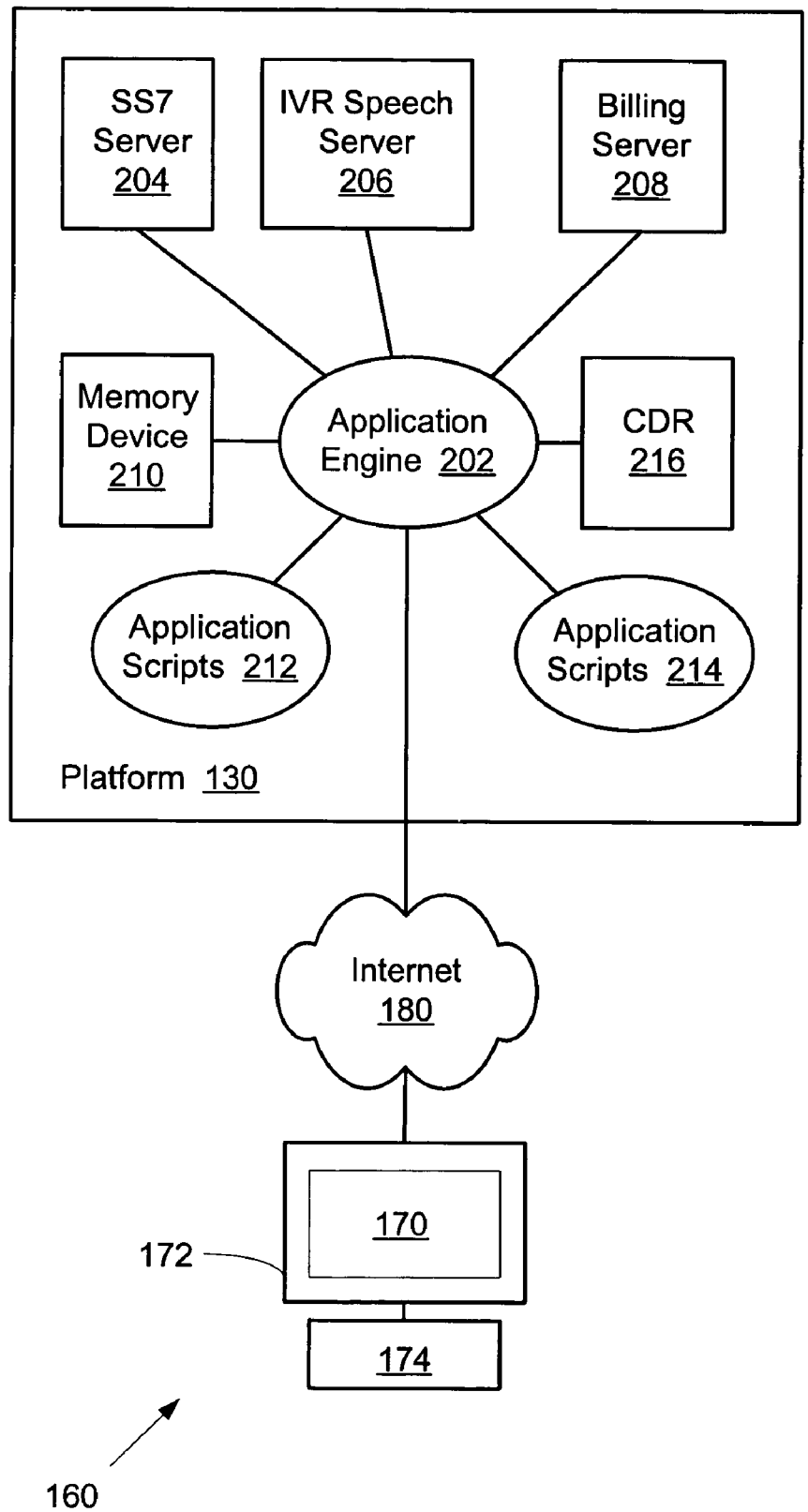
FIG. 2 is a block diagram of a platform that may be used to provide a subscriber alterable call transfer service, in accordance with an embodiment of the invention.

FIG. 2 is a block diagram of the platform 130 of FIG. 1, that may be utilized to provide a subscriber alterable call transfer service, in accordance with an embodiment of the invention. As shown in FIG. 2, the switch 132 and IVR 134 of the platform 130 may be implemented as an applications engine 202, coupled with SS7, IVR speech and Billing servers 204, 206 and 208, respectively. The application engine 202 may further be coupled with a memory device 210 (i.e. including one or more databases used in implementing the subscriber alterable call transfer service subscription or other services provided by the platform 130), and one or more applications scripts 212, 214 that maintain programming that may be used by the application engine 202 in carrying-out the functionality of the platform 130. The application engine 202 may be coupled with the subscriber host 160, for example, where the application engine 202 communicates with the subscriber host 160 to provide any of the subscriber GUIs 170 discussed herein. The subscriber host 160 may communicate with the application engine 202, for example, via the Internet 180.

The application engine 202 receives call transfer service information, for example, an attention signal and/or function signal definition from the subscriber via the subscriber GUI 170, and updates the subscriber's call transfer service subscription in the memory device 210 responsive to the information received at the subscriber GUI 170. The application engine 202 may then be used to provide the call transfer service, accounting for the information received at the subscriber GUI 170. The creation and modification of a call transfer service subscription using the subscriber GUI 170 and the utilization of the call transfer service responsive to a call transfer service subscription created or updated via the subscriber GUI 170 will be discussed in further detail below.

The application engine 202 may comprise, for example, one or more call transfer service controllers (not shown) operating under one or more application scripts 212, 214, providing programming for controlling operation of the application engine 202 in providing the functionality for implementing a subscriber alterable call transfer service, or other services that may be provided at the platform. The Signal System 7 (SS7) server 204 has capabilities for parsing received SS7 messages, and for generating SS7 messages, for example, to communicate to the SSP 112 to indicate that a received telephone call from a calling party is to be placed on hold, transferred, conferenced or returned to a menu routing application. The IVR server 206 has capabilities for providing IVR functionality discussed herein, for example, providing text-to-speech messages or pre-recorded messages to a calling party, and for receiving attention signals, function signals and/or destination signals from the subscribing party such as DTMF tone sequences. The billing server 208 handles the determining and storing of billing information for the platform 130, where the billing information may be stored in a memory device 216 such as Compact Disc Recordable (CDR) device, for storing billing information at the platform 130. Although not shown, additional or alternative servers may be provided, where it is desirable to communicate with an SSP or other telephone network equipment external to the platform, for example, using AIN, Internet or other communication protocols.

As will be appreciated by one skilled in the art, each of the SS7, IVR and Billing servers 204, 206 and 208, respectively, may be implemented using separate controllers operating under separate programming, for example, provided from memory devices present within the respective servers. The servers 204, 206 and 208 are capable of communicating with the applications engine 202 under one or more communications protocols, as will be appreciated by one skilled in the art. In the alternative, the functionality provided by the servers 204, 206 and 208 may be implemented at the applications engine 202, through one or more controllers. Further, the applications engine has capabilities for communicating with the subscriber GUI 170, for example, using PPP, TCP/IP, or other known communication protocols, as would be appreciated by one skilled in the art.

The platform 130 discussed above may be implemented, for example, as a Readi800 topology, created and maintained by United States Advanced Networks. Such a topology may include, for example, a Readi800 Web Server having capabilities for communicating with a subscriber via a subscriber GUI, a Readi800 Application database and Tomcat Server having firewall capabilities to protect the platform 130 and telephone network 100 from unwelcome access and attacks from unauthorized users, Readi800 Call Processing Equipment, and Internet routing capabilities. The components of the platform 130 may be coupled, for example, by Ethernet connections, using Cat 5 cable, or by any other fashion allowing the various components within the platform 130 to communicate with one another.

The various subscriber GUIs describer herein, will be described in two contexts: first, how a subscriber of the call transfer service may utilize one or more of the subscriber GUIs to provide call transfer service information to update the subscriber's call transfer service subscription; and second, how the call transfer service may be operated to provide the call transfer service functionality to the subscriber, accounting for call transfer service information that may be provided by the subscriber via one or more of the subscriber GUIs discussed herein. Specifically, the creation and/or modification of a call transfer service subscription will be discussed with respect to the exemplary subscriber GUIs of FIGS. 3-5 and flowcharts of FIGS. 6-7, in accordance with embodiments of the invention. The creation and/or modification of speed dial codes that may be utilized in conjunction with the call transfer service will be discussed with respect to the exemplary subscriber GUI's of FIGS. 8-10 and the flowchart of FIG. 11, in accordance with embodiments of the invention. The creation and/or modification of prompts that may be utilized in conjunction with the call transfer service will be discussed with respect to the exemplary subscriber GUI's of FIGS. 12-14, in accordance with embodiments of the invention. The utilization of the call transfer service under a call transfer subscription that has been created or modified using a subscriber GUI will be discussed with respect to the flowcharts of FIGS. 15-16, in accordance with an embodiment of the invention. The operation of the call transfer service within a telephone network such as the telephone network 100 will be discussed with respect to the flowchart of FIG. 17, in accordance with an embodiment of the invention.

Generally, and as will be discussed in more detail below, the call transfer service is typically utilized by a primary agent, who may be the subscriber or an employee of the subscriber (i.e. a switchboard operator at a subscriber company location). The primary agent may be, in the alternative, a IVR at a subscriber company location. Generally, the primary agent may communicate with a calling party, place the caller on hold, and transfer or conference the calling party to a secondary agent. The secondary agent may be, for example, an employee of the call transfer service subscriber, or a third party unrelated to the calling party or the subscriber. In the alternative, the secondary agent may be a IVR.

The creation and/or modification of a call transfer service subscription will be discussed with respect to the exemplary subscriber GUIs of FIGS. 3-5 and the flowcharts of FIGS. 6-7. As will be appreciated by one skilled in the art, such GUIs may be accessed and utilized using a computer mouse, a touch screen, voice commands provided through a microphone or other device, any combination of the above, or any other means sufficient for allowing selection of options and/or the entry of information for any of the subscriber GUIs discussed herein.

Figure 3:
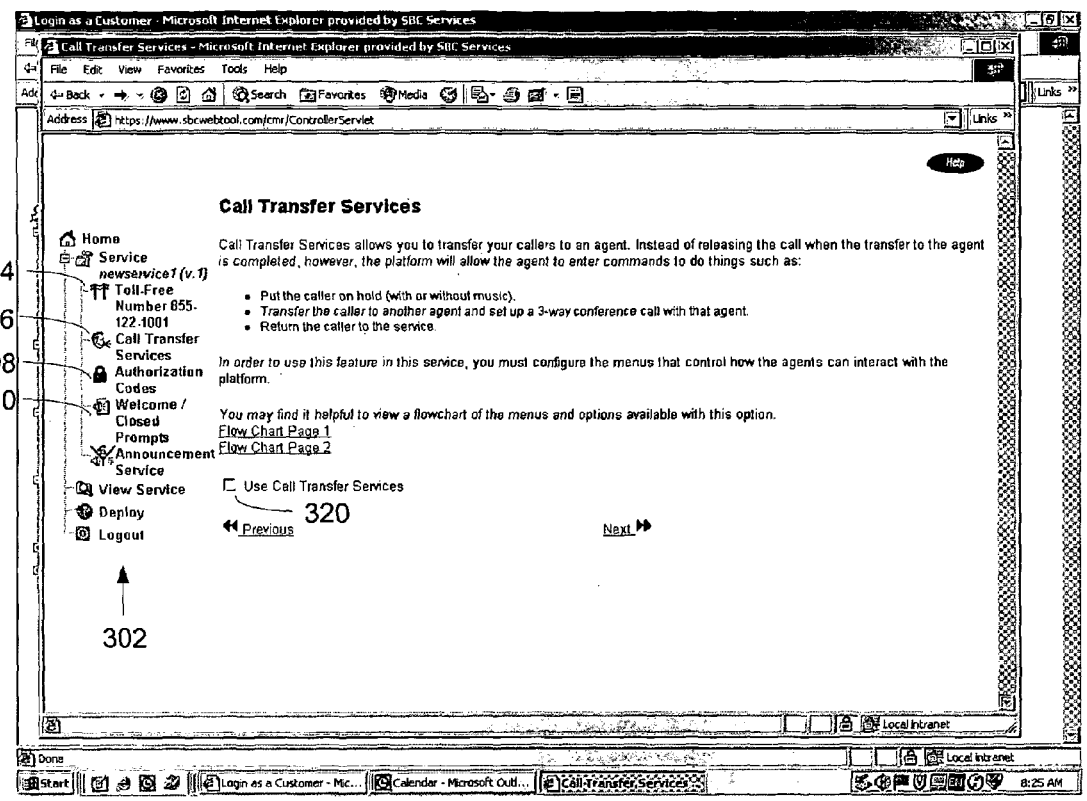
FIG. 3 illustrates an exemplary subscriber graphic user interface (GUI) assisting a call transfer service subscriber in providing call transfer service information, in accordance with an embodiment of the invention.

FIG. 3 illustrates an exemplary subscriber GUI 300 assisting a call transfer service subscriber in providing call transfer service information, in accordance with an embodiment of the invention. The subscriber GUI 300 of FIG. 3 may be utilized by a subscriber in creating a new call transfer service handling scheme for a particular telephone number, or in modifying an existing call transfer service handling scheme describing the handling of a telephone call received via the telephone number. As seen in a sidebar 302 of FIG. 3 (similar sidebars may be provided for any of the subscriber GUIs discussed herein, as will be appreciated by one skilled in the art), a subscriber is provided a series of options, for example, to look up toll-free numbers 304 that are available for purchase by the company, and a call transfer service option 306 that may be created or modified by the subscriber to create a call-handling scheme. The subscriber is further presented with capabilities for requiring a calling party to enter an authorization code 308 before the call is handled by the platform. For example, where the telephone number called by the calling party is strictly for company employees, the employees may need to enter an authorization code before being transferred to a particular company branch or department, such as the company HR department. The sidebar 302 may additionally provide the subscriber with options of creating or managing voice prompts 310 that may be used by the platform in handling a telephone call. The subscriber may select the "Use Call Transfer Service" option 320 to create or modify a call transfer service subscription for a particular telephone number. When selecting the "Use Call Transfer Service", the subscriber may be provided with the subscriber GUI shown in FIG. 4.

Figure 4:
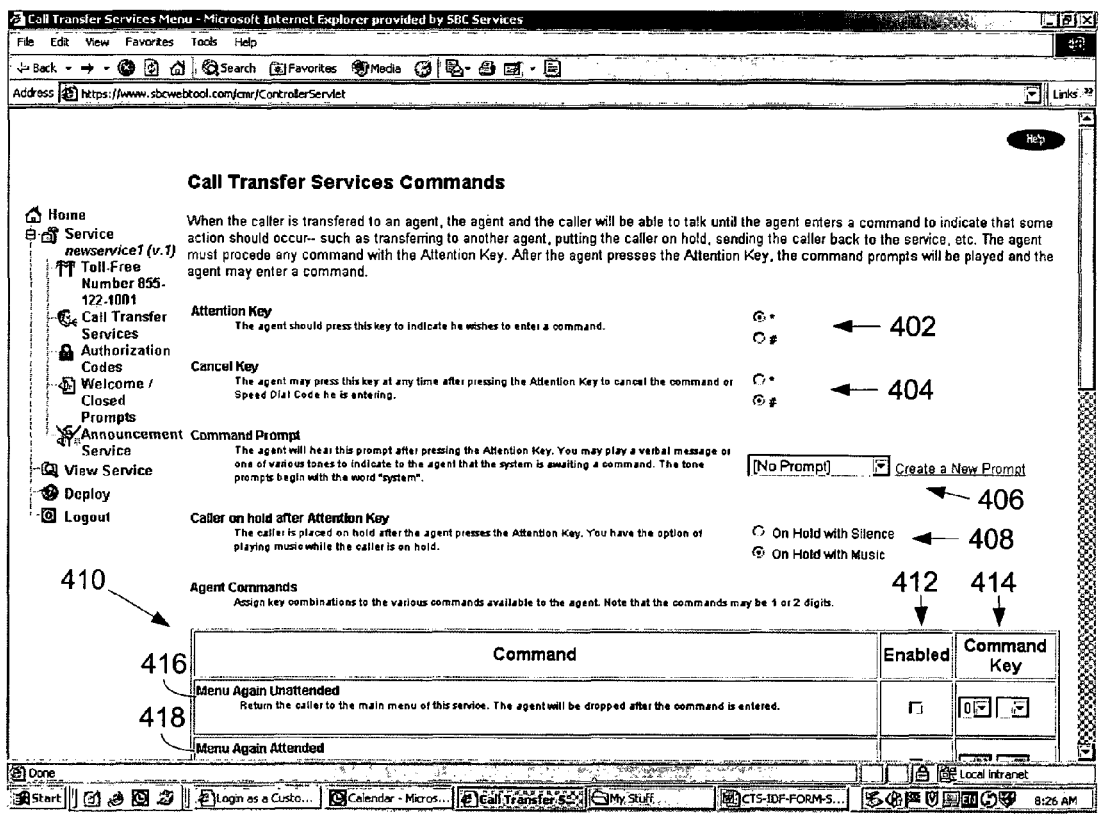
FIGS. 4-5 illustrate exemplary subscriber GUIs allowing a subscriber to provide call transfer service information, in accordance with an embodiment of the invention.

FIG. 4 illustrates an exemplary subscriber GUI 400 allowing a subscriber to provide call transfer service information in accordance with an embodiment of the invention. Through the subscriber GUI of FIG. 4, the subscriber may modify an existing call transfer service routine, or create a new one. The subscriber may define an attention signal as an attention key at 402 to be used to get the attention of the call transfer service platform. The attention key is typically a DTMF key, for example, a "*" or "#" key. The subscriber may define a cancel signal as a cancel key at 404, indicating to the platform that a previously entered attention key was in error, and that no function signal (described below) will follow. For example, the cancel key is typically a DTMF key, for example, the other of the "*" and "#" key that was selected as the attention key.

The subscriber may further specify a prompt at 406 to be played to the primary agent when the attention key is pressed, for example, provided as a verbal message, as a text-to-speech reading, or as a recorded .WAV file provided by the subscriber. In addition, the subscriber may specify at 408 how the calling party is handled after the attention key is entered, for example on hold with silence, or on hold with music.

Additionally, the subscriber may define a number of function signals (commands) shown generally at 410 that may be configured by the subscriber to indicate how calls will be handled by the call transfer service platform. A command describes an operation that will occur with regards to the telephone call from the calling party, and where a transfer or conference is desired, a command describes the relationship between the calling party, and primary and secondary agents. The subscriber may enable various commands at 412, and indicate a 1 or 2 character DTMF sequence at 414, that may be used by the subscriber in accessing the command while using the call transfer service. Such DTMF entry may be as shown, using a drop down menu, or may be provided by the user of the GUI by typing the particular DTMF symbol into the respective DTMF box. It will be appreciated by one skilled in the art that larger DTMF sequences (i.e., greater than a 2 DTMF sequence) may be defined if desired, where additional drop boxes may be provided to accommodate larger DTMF sequences for one or more of the commands.

Commands that may be defined, including, for example, Menu Again Unattended 416, and Menu Again Attended 418 commands. Where the Menu Again Unattended command 416 (i.e., 1 or 2 key DTMF sequence) is entered by the primary agent, the platform may forward incoming telephone calls to a IVR. Where the Menu Again Attended 418 command (i.e., 1 or 2 DTMF key sequence) is entered by the primary agent, the platform may allow the telephone calls to again reach the primary agent (i.e., not be forwarded to a IVR for handling). FIG. 5 illustrates a subscriber GUI 500 where a subscriber may define additional commands, in accordance with and embodiment of the invention. Although shown as a separate subscriber GUI, it will be appreciated that the subscriber GUI 500 of FIG. 5 may instead be presented to the subscriber as a continuation of the subscriber GUI 400, accessible by scrolling down in the subscriber GUI 400 of FIG. 4.

Figure 5:
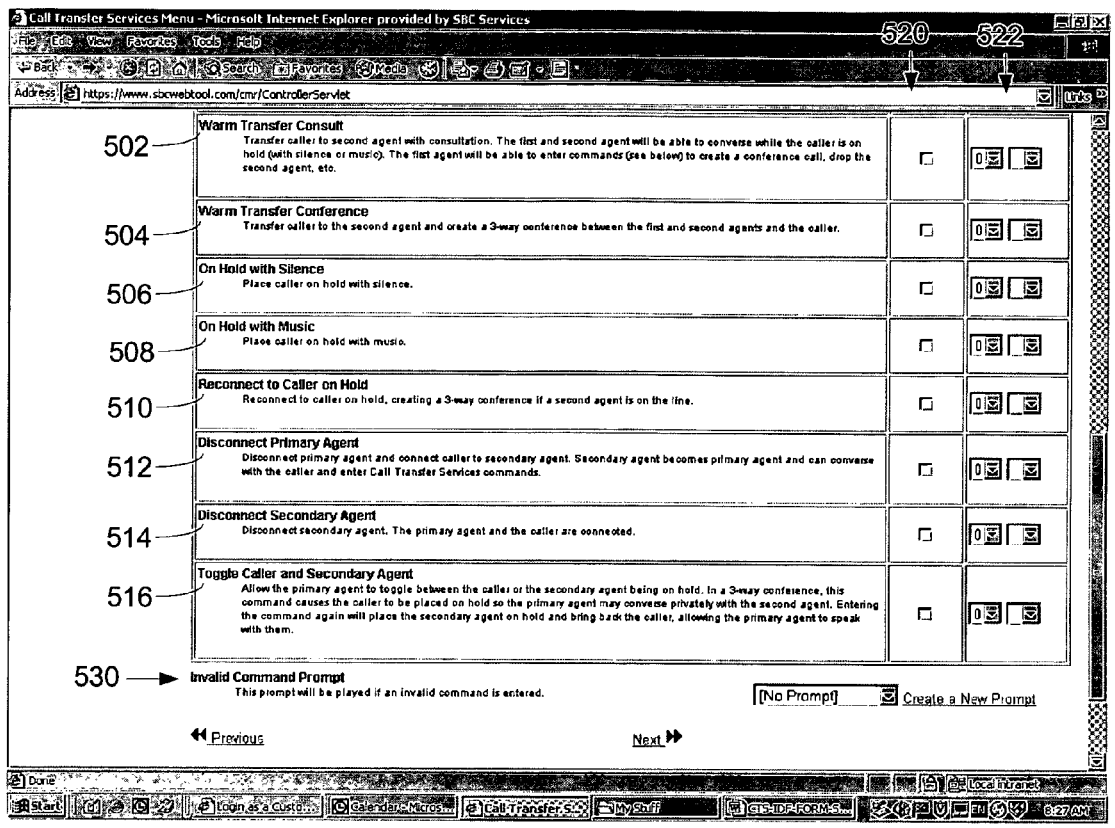

As shown in FIG. 5, the subscriber may additionally define Warm Transfer Consult 502, Warm Transfer Conference 504, On Hold With Silence 506, On Hold With Music 508, Reconnect To Caller On Hold 510, Disconnect Primary Agent 512, Disconnect Secondary Agent 514, and Toggle Caller and Secondary Agent 516 commands, where each respective function signal may be defined in a similar fashion as discussed above, for example, as a 1 or 2 DTMF sequence. In a similar fashion as discussed above with respect to FIG. 4, a user may enable at 520 any of the various commands to be utilized by a subscriber of the call transfer service, and provide a corresponding DTMF sequence (i.e., a 1 or 2 DTMF key sequence) at 522 for the respective command/function. Other commands definitions may be possible.

The Warm Transfer Consult command 502 may allow the primary agent to consult or interface with a secondary agent while the incoming caller remains on hold, and the Warm Transfer Conference command 504 may transfer the calling party to a secondary agent to create a 3-way conference call between the primary agent, the secondary agent and the caller. The On Hold With Silence command 506 allows the primary agent to place the caller on hold with silence, while the On Hold With Music command 508 allows the primary agent to place the caller on hold with music. The Reconnect To Caller On Hold function 510 allows the primary agent to reconnect with a caller that has been placed on hold, and if the primary agent has connected with a secondary agent, to create a three way conference call between the caller, the primary agent and the secondary agent. The Disconnect Primary Agent command 512 allows the primary agent to disconnect from a call, creating a call between the secondary agent and the caller, where the secondary agent may enter call transfer service commands. The Disconnect Secondary Agent command 514 disconnects the secondary agent from a call, leaving the primary agent and the calling party.

The Toggle Caller and Secondary Agent command 516 allows the primary agent to toggle between a caller and a secondary agent, and in the case of a 3-way conference call between the primary agent, the calling party, and the secondary agent, allows the primary agent to speak only with the secondary agent while placing the calling party on hold. The subscriber may further define an Invalid Command Prompt at 530 that will be read or played back (in the case of a provided .WAV file), where the primary agent has entered an improper DTMF sequence, for example, a DTMF sequence not corresponding to a defined command. It will be appreciated by one skilled in the art that information entered at the subscriber GUIs, for example GUIs 300, 400 and 500, may be continually stored at the platform 130 (i.e., the memory device 210), at predetermined intervals (i.e., every 60 seconds), or in the alternative, may be updated by the user selecting some link provided within the particular subscriber GUI, such as a "next" link or "update" link.

Figure 6:
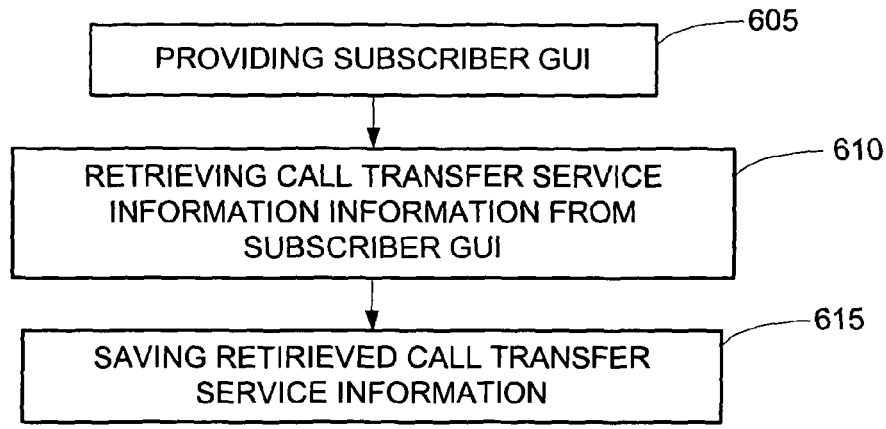
FIG. 6 is a flowchart illustrating the creation of a call transfer service subscription, in accordance with an embodiment of the invention.

FIG. 6 is a flowchart illustrating creation of a call transfer service subscription using one or more subscriber GUIs, for example, any of the subscriber GUIs of FIGS. 3-5, in accordance with an embodiment of the invention. As shown in FIG. 6, a subscriber GUI is provided 605 to a potential subscriber of the call transfer service. This may occur, for example, where the user enters a username and password at a login screen (not shown), and is provided a subscriber GUI such as the subscriber GUI 300 of FIG. 3. For example, the user may provide the login information at a login screen at the subscriber host 160. Where the application engine 202 detects a proper login username and password, it may access application scripts 212 and/or 214, and/or the memory device 210, to provide the subscriber GUI 300 to the user. The subscriber GUI 300 is then provided, typically after the user has selected the call transfer service option 306 of the subscriber GUI 300. As will be appreciated by one skilled in the art, the application engine 202 may determine whether a call transfer service subscription is being created or modified, for example, by determining whether a current call transfer service subscription is currently associated with respect to a particular username or toll free number associated with the username. Where a call transfer service subscription does not exist, the application engine 202 may determine that a new call transfer service subscription is being created. Further, where the application engine 202 determines that the user of the GUI has selected a new toll free number, and determines that no call transfer service subscription is yet associated with the new toll free number, the application engine 202 may determine that a call transfer service subscription is to be created (i.e., rather than modified). Where the call transfer service subscription is being created, the application engine 202 may provide default values for the various fields of the provided subscriber GUIs.

The user may then navigate the one or more provided subscriber GUIs, for example, the subscriber GUI's 300, 400 and 500, to provide various information to define the particular call transfer service subscription. For example, as discussed above, the user may provide information regarding any of the attention key 402, cancel key 404, command prompt 406, caller on hold after attention key 408, as well as information regarding enabling and/or defining any of the commands shown generally at 410 and in the subscriber GUI 500.

Upon the user providing the call transfer service information, the call transfer service information may be retrieved from the various fields of the subscriber GUI(s), as shown at box 610. This may occur on an ongoing basis, for example, at fixed, predetermined intervals (i.e., every 60 seconds), or as will be appreciated by one skilled in the art, may occur responsive to a particular selection by the user, such as the user selecting the "next" prompt at a particular subscriber GUI, or selecting some create or update subscription option that may be provided, as will be appreciated by one skilled in the art. At that time, the application engine 202 may determine the information provided at the subscriber GUI(s) of the subscriber host 160, and save the information at the memory device 210 as shown at box 615, for example, as a data base file associated with the particular user and/or telephone number for which the call transfer service subscription is being defined. In this way, the user is able to create a call transfer service subscription for a particular telephone number utilizing provided subscriber GUIs, such as, for example, the subscriber GUI's 300, 400 and/or 500 of FIGS. 3, 4 and 5 respectively.

Figure 7:
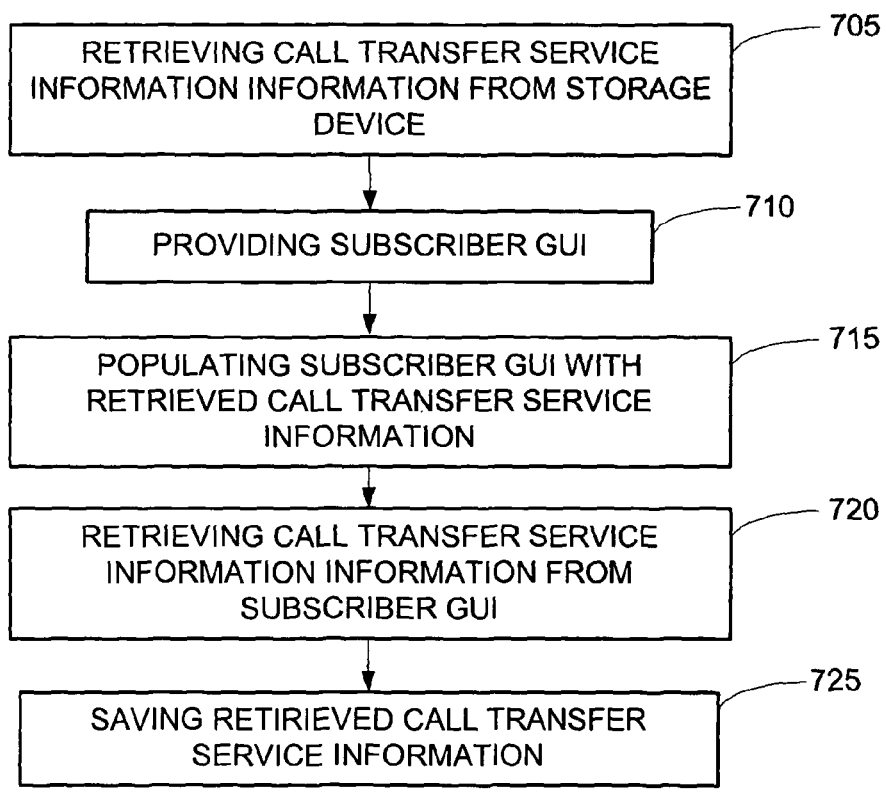
FIG. 7 is a flowchart illustrating the editing of a call transfer service subscription, in accordance with an embodiment of the invention.

FIG. 7 is a flowchart illustrating the editing of a call transfer service subscription using one or more subscriber GUIs, for example, the subscriber GUIs of FIGS. 3-5, in accordance with an embodiment of the invention. As shown at box 705, call transfer service subscription is retrieved from the memory device 210. Such call transfer service subscription information may be associated with a particular telephone number for the username used by the user to log in. Where a username is associated with multiple telephone numbers having a call transfer subscription, it will be appreciated that the user may be provided with means for selecting the particular call transfer service subscription that is desired to be edited.

A subscriber GUI may be provided as shown at box 710, for example any of the subscriber GUIs 300, 400 or 500. The application engine 202 may populate 715 the various fields (i.e., the attention key 402, cancel key 404, command prompt 406, caller on hold after attention key 408, as well as information regarding enabling and/or defining any of the commands shown generally at 410 and in the subscriber GUI 500) of the GUI(s) with information pertaining to the particular call transfer subscription being edited. For example, information may be retrieved for the various fields from the memory device 210, and more specifically, a database file of the memory device 210 associated with the particular call transfer service subscription being edited/modified.

The user may then navigate the one or more provided subscriber GUIs, for example, the subscriber GUI's 300, 400 and 500, to alter any of the various call transfer service information, thereby editing/modifying the call transfer service subscription. For example, and similar to as discussed above, the user may update information/definitions regarding any of the attention key 402, cancel key 404, command prompt 406, caller on hold after attention key 408, as well as alter any enabling and/or definitions of any of the commands shown generally at 410 and in the subscriber GUI 500.

Upon editing any of the call transfer service information, the call transfer service information may be retrieved from the various fields of the subscriber GUI(s), as shown at box 720, in a similar fashion as discussed above with respect to box 610. As discussed above with respect to box 610, this information retrieval may occur on an ongoing basis, for example, at fixed, predetermined intervals, or may occur responsive to a particular selection by the user, such as the user selecting the "next" prompt at a particular subscriber GUI, or upon selecting some create or update subscription option that may be provided.

The application engine 202 may then save the retrieved information provided at the subscriber GUI(s) of the subscriber host 160 at the memory device 210 as shown at box 725, for example, as a data base file associated with the particular user and/or telephone number for which the call transfer service subscription is being modified. It will be appreciated that the application engine 202 may retrieve information from all fields of the subscriber GUI(s), or may retrieve information only from fields that were edited by the user during the editing of the call transfer subscription. In the former case, the application engine 202 may store all the information at the memory device 210, for example, at a corresponding database file of the memory device 210. In the case of the latter, the application engine 202 may replace only portions (i.e., fields) of the database file of the memory device 210 corresponding with fields of the subscriber GUI(s) that were edited/modified by the user for the call transfer service subscription. In this way, the user is able to edit a call transfer service subscription for a particular telephone number utilizing provided subscriber GUIs, such as, for example, the subscriber GUI's 300, 400 and/or 500 of FIGS. 3, 4 and 5 respectively.

Figure 8:
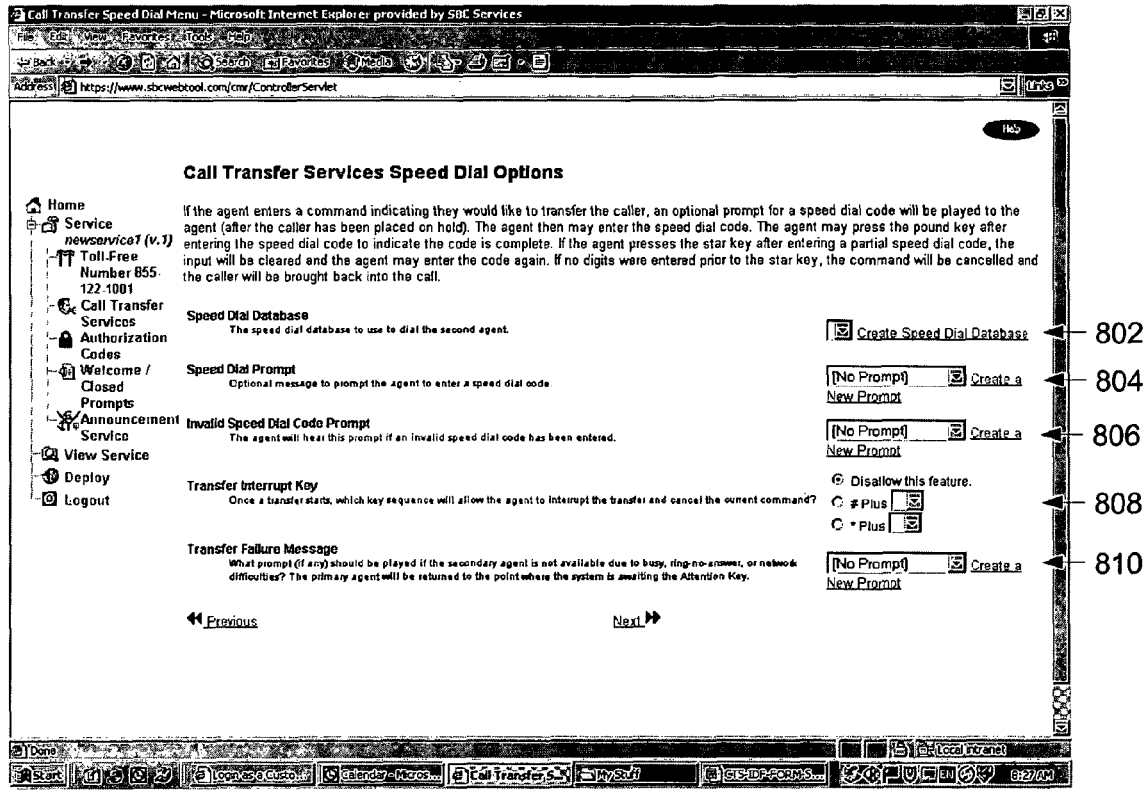
FIGS. 8-10 illustrate exemplary subscriber GUIs allowing a subscriber to create and/or or edit extension code or speed dial options that may be used in conjunction with a call transfer service, in accordance with an embodiment of the invention.
Figure 9:
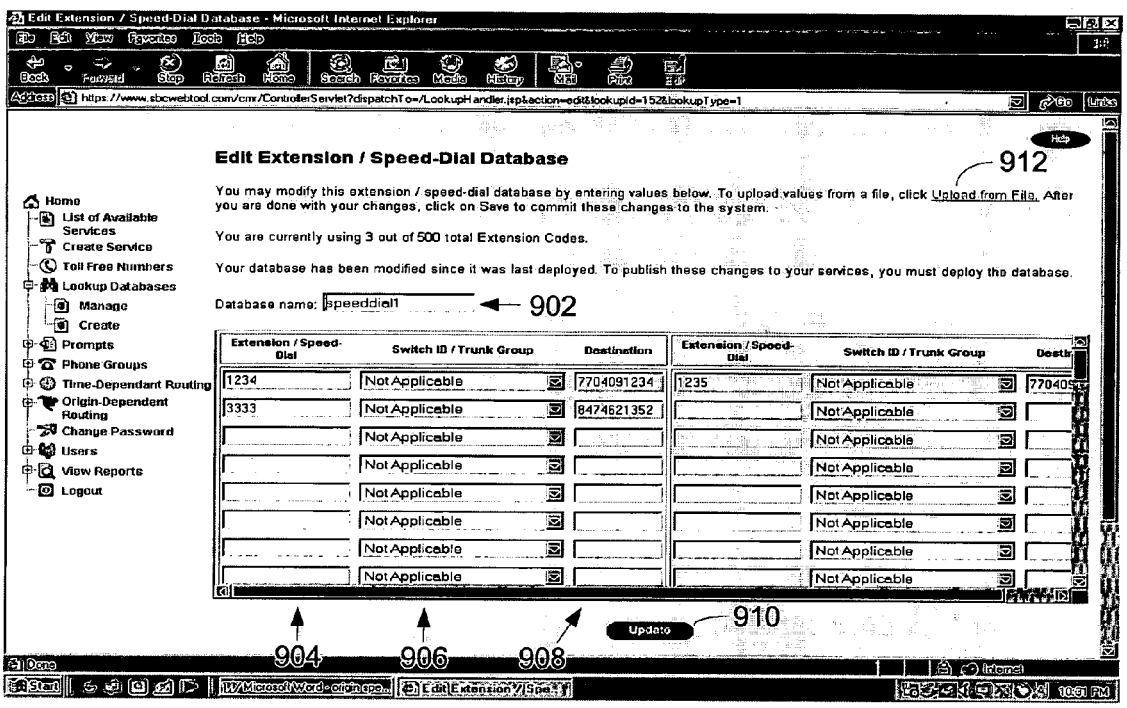
Figure 10:
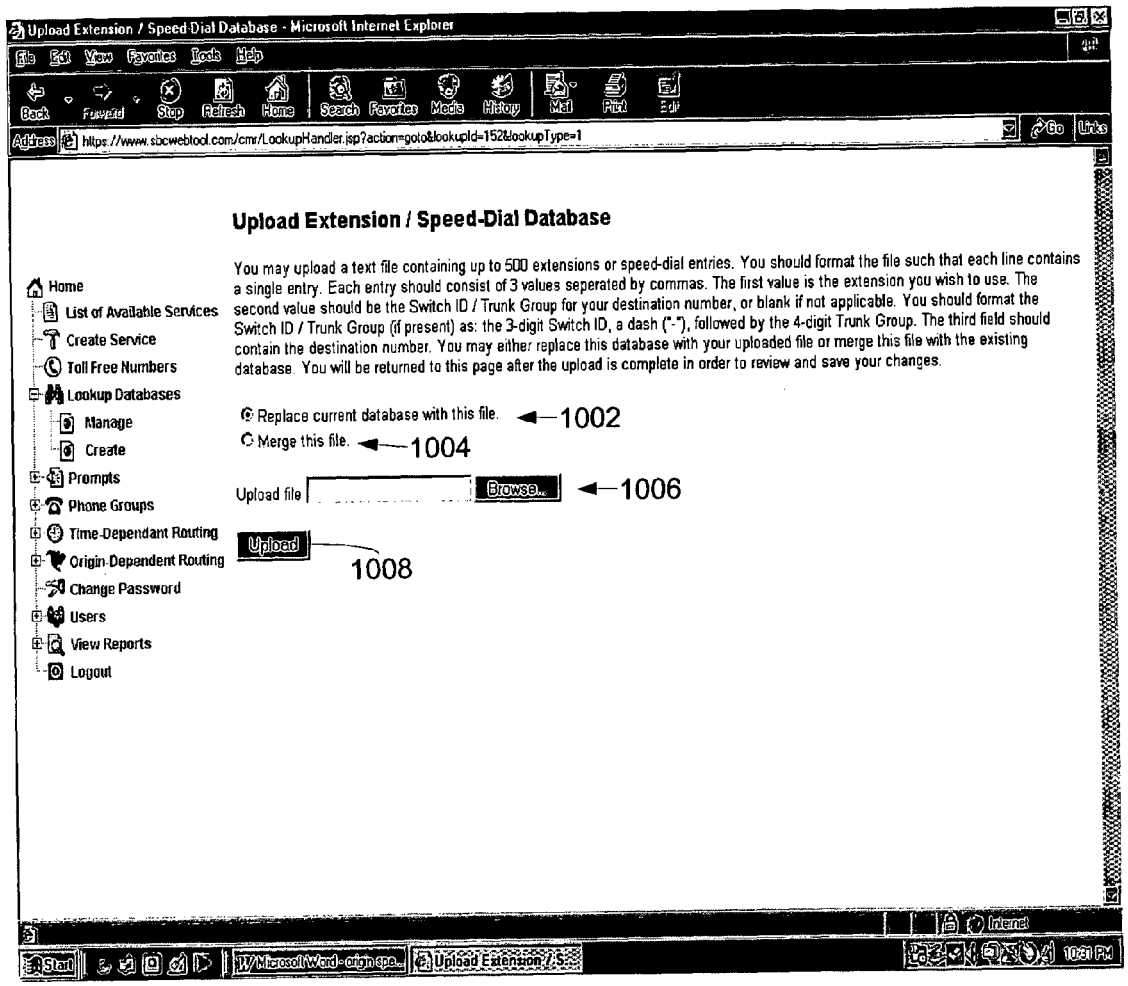

FIGS. 8-10 are exemplary subscriber GUIs that may be utilized in providing destination signal definition information, for example, speed dial information that may be utilized in conjunction with a call transfer service, in accordance with embodiments of the invention.

FIG. 8 illustrates an exemplary subscriber GUI 800 allowing a subscriber to create or edit speed dial options that may be used with, or separate from, the call transfer service. As shown in FIG. 8, the subscriber may specify at 802 a speed dial database for use with the call transfer service, and an optional speed dial prompt at 804, prompting the primary agent to enter a speed dial code. The subscriber may further specify or provide a prompt played to the primary agent at 806 where an invalid speed dial code is entered. In addition, the subscriber may specify at 808 whether a transfer-interrupt feature is allowed to interrupt an initiated transfer or conference call, and a DTMF key that initiates the transfer interrupt. Further, the subscriber may specify or provide at 810 a prompt to be used where a transfer or conference attempt has failed, for example, because of unavailability of the secondary agent (i.e. the secondary agent does not answer the call, or is busy on another call).

FIG. 9 illustrates an exemplary subscriber GUI 900 allowing a subscriber to define speed dial/extension codes in accordance with an embodiment of the invention. As shown in FIG. 9, a speed dial database may be specified at 902, and a subscriber may enter extension/speed dial codes at 904, any applicable switch ID/Trunk group to be used for the speed dial code at 906, and a destination telephone number corresponding to the code at 908. It will be appreciated that extension/speed dial codes 904 may include 10 digit toll free numbers. The toll free number may have corresponding defined Switch ID/Trunk Group information 906 and destination information 908, or instead, proper routing information may be determined at the platform 130 for the toll free number. In the case of the latter, the Switch ID/Trunk Group information 906 may be unprovided, or indicated as not available.

In the case where the Switch ID/Trunk Group information 906 is unprovided, or indicated as not available, the platform may determine that the toll free number is one that has been provisioned at the platform 130 (i.e., the platform 130 may maintain a toll free number mapping to a proper routing for the toll free number, for example, in the memory device 210). In the alternative, where the toll free number is not provisioned at the platform 130, the platform 130 may have capabilities for building a link with some external database or mapping table to determine proper routing information for the toll free number, as will be appreciated by one skilled in the art.

There may be some limited number of extension/speed dial codes that may be provided, for example 500, or there may be no limit on the number of extension/speed dial codes provided. Upon entering the desired extension/speed dial codes at 904, the subscriber may indicate to update the extension/speed dial information with the platform at 910. This may include, for example, the application engine 202 updating the speed dial and/or extension code database at the memory device 210 of the platform 130. In addition, or in the alternative, the subscriber may upload a file including one or more extension or speed dial codes at 912, that may provide the user with the subscriber GUI of FIG. 10.

Figure 11:
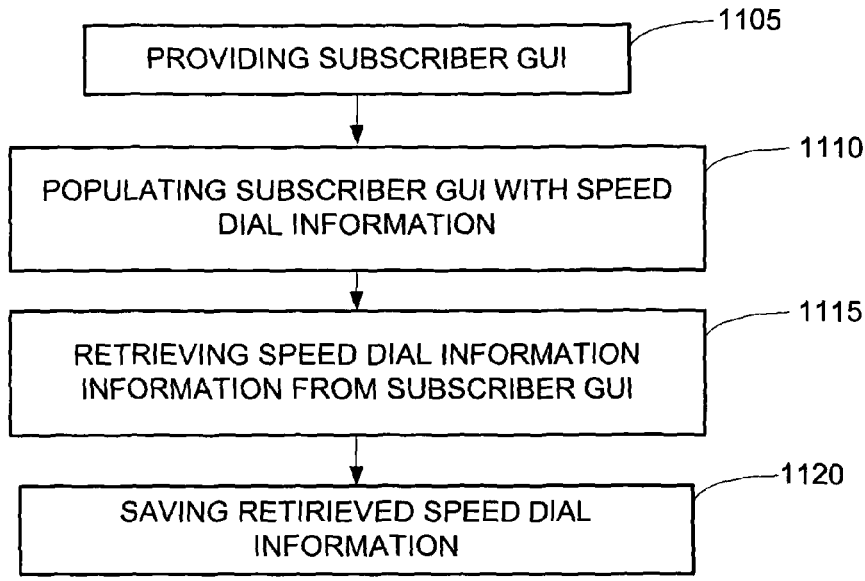
FIG. 11 is a flowchart illustrating the creation or editing of a speed dial database that may be used in conjunction with a call transfer service, in accordance with an embodiment of the invention.

FIG. 10 is an exemplary subscriber GUI 1000 allowing a subscriber to upload a file including at least one extension and/or speed dial code, in accordance with an embodiment of the invention. As shown in FIG. 10, the subscriber may select to replace an extension or speed dial code database with a new one at 1002, or to merge the provided file that includes at least one extension and/or speed dial defined codes with the existing database file at 1004. The file may be, for example, a text file, where each line of the text file represents an extension/speed dial entry. Each entry may include three values, separated by commas. The first value may represent the extension or speed dial code. The second value represents the switch/trunk group ID, for example as a 3 digit switch followed by a "-" followed by a 4 digit trunk ID. The second value may be left blank if not applicable. The third value represents the destination telephone number, typically comprising ten digits. The speed dial file may be selected at 1006, for example by browsing various data sources that may be connected with the subscriber host 160. Upon selection of the speed dial file, the file may be uploaded to the platform 130 using the upload option 1008. FIG. 11 is a flowchart illustrating the creation or editing of at least one speed dial database, in accordance with an embodiment of the invention.

As shown in the flowchart of FIG. 11, the user is provided a subscriber GUI at box 1105. This may occur, for example, where the user enters a username and password at a login screen (not shown), and is provided a subscriber GUI such as the subscriber GUI 800 of FIG. 8. For example, the user may provide the login information at a login screen at the subscriber host 160, where the application engine 202 detects a proper login username and password, and accesses application scripts 212 and/or 214, and/or the memory device 210, to provide the subscriber GUI 800 to the user. In the alternative, the GUI 800 may be provided as a continuation of the user providing other call transfer service subscription information, for example, through any of subscriber GUIs 300, 400 or 500, by the user selecting a 'next' link in the particular GUI, as will be appreciated by one skilled in the art.

Responsive to whether the user selects whether to create a new speed dial database, or to modify an existing one, the fields of the GUI are populated with speed dial information, as shown at 1110. Where the speed dial extensions/codes are being initially created, the application engine 202 may populate 1110 the subscriber GUI with default values for the various fields of the provided subscriber GUIs (i.e., speed dial prompt at 804, invalid speed dial code prompt at 806, transfer interrupt key at 808, and transfer failure message at 810, database name 902, extension code 904, switch ID/Trunk Group 906, destination 908, replace current database with file at 1002, and merge file at 1004) that may include null values (i.e., left blank) or initial selections. Where an existing speed dial database is being modified, the application engine 202 may populate the various fields of the GUI(s) 800, 900 or 1000 with previously selected values for the particular speed dial database. For example, the application engine 202 may populate 1110 the various fields (i.e., speed dial prompt at 804, invalid speed dial code prompt at 806, transfer interrupt key at 808, and transfer failure message at 810, database name 902, extension code 904, switch ID/Trunk Group 906, destination 908, replace current database with file at 1002, and merge file at 1004) of the GUI(s) with information pertaining to the particular speed dial database file being edited. For example, the information may be retrieved for the various fields from the memory device 210, and more specifically, a database file of the memory device 210 associated with the particular speed dial database being edited/modified.

The user may then navigate the one or more provided subscriber GUIs, for example, the subscriber GUI's 800, 900 and 1000, to provide various information to define the speed dial extentions/codes. For example, as discussed above, the user may provide information regarding any of the speed dial prompt at 804, invalid speed dial code prompt at 806, transfer interrupt key at 808, and transfer failure message at 810, database name 902, extension code(s) 904, switch ID/Trunk Group 906, destination 908, and where a new database file is being provided, a replace current database with file at 1002, and merge file field at 1004.

Upon the user providing the call transfer service information, the speed dial information may be retrieved from the various fields of the subscriber GUI(s), as shown at box 1115. This may occur on an ongoing basis, for example, at fixed, predetermined intervals (i.e., every 60 seconds), or as will be appreciated by one skilled in the art, may occur responsive to a particular selection by the user, such as the user selecting the "next" prompt at a particular subscriber GUI, or selecting some create or update subscription option that may be provided (i.e., update option at 910 or upload option at 1008), as will be appreciated by one skilled in the art.

The application engine 202 may then determine the information provided at the subscriber GUI(s) of the subscriber host 160, and save the information at the memory device 210 as shown at box 1120, for example, as a data base file associated with the particular user and/or telephone number for which the speed dial information is being created/edited. It will be appreciated that the application engine 202 may retrieve information from all fields of the subscriber GUI(s), or may retrieve information only from fields that were edited by the user during the editing of the speed dial information. In the former case, the application engine 202 may store all the information at the memory device 210, for example, at a corresponding database file of the memory device 210. In the case of the latter, the application engine 202 may replace only portions of the database file of the memory device 210 corresponding with fields of the subscriber GUI(s) that were edited/modified by the user for the speed dial information. In this way, the user is able to create or edit speed dial information for use in conjunction with a call transfer service, or separate therefrom, for a particular telephone number, utilizing provided subscriber GUIs, for example, the subscriber GUI's 800, 900 and/or 1000 of FIGS. 8, 9 and 10 respectively.

Figure 12:
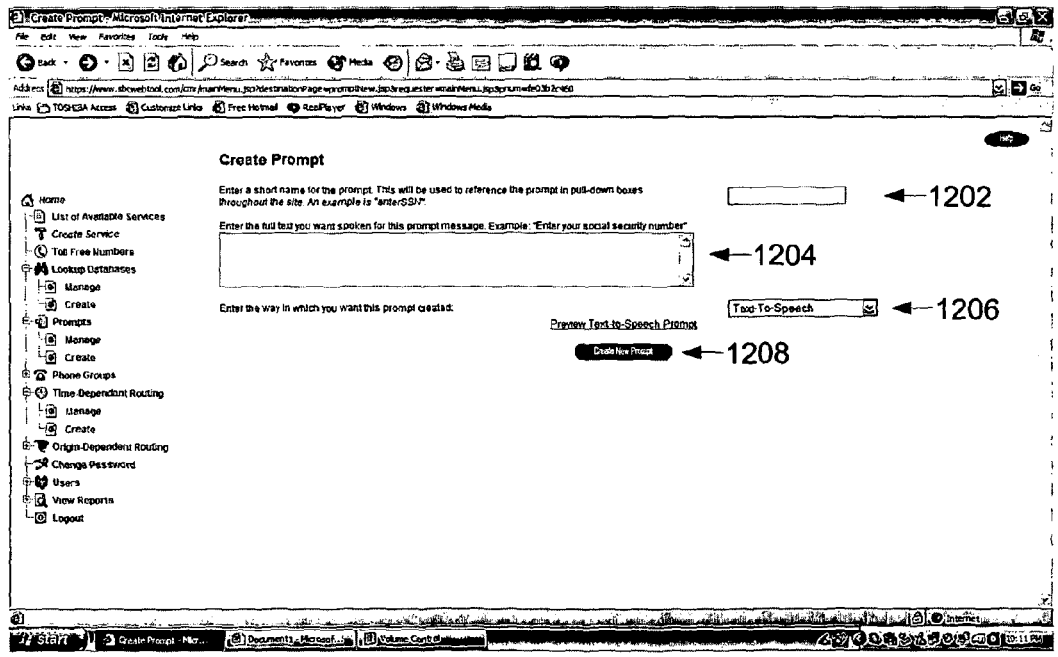

The subscriber may define, create or edit any of the voice prompts discussed above, for example, the command prompt 406, invalid command prompt at 530, speed dial or invalid speed dial code prompt at 804 and 806 respectively, and the transfer failure message prompt at 810, as discussed below with reference to the subscriber GUIs of FIGS. 12-14. As will be appreciated by one skilled in the art, the voice prompts may be created as text-to-speech prompts, or as .WAV files, downloaded to the platform 130. FIGS. 12-14 illustrate exemplary subscriber GUIs allowing a subscriber to create a voice prompt in accordance with an embodiment of the invention.

FIG. 12 illustrates an exemplary subscriber GUI 1200 allowing a subscriber to create a voice prompt, in accordance with an embodiment of the invention. As shown in FIG. 12, a prompt name may be provided by the subscriber at 1202. The subscriber may then enter text desired for the prompt text at 1204, and indicate how the prompt is to be presented at 1206.

Alternatively, a subscriber may create a .WAV file on a PC such as the subscriber host 160, and upload the .WAV file to the platform 130. In this circumstance, the subscriber may indicate the uploaded .WAV file name at the prompt name field 1202, indicating that the .WAV file is to be used for the voice prompt. In either of the above two circumstances, the prompt may be created upon selection of the create prompt option 1208 by the subscriber.

FIG. 13 illustrates an exemplary subscriber GUI 1300 allowing a subscriber to manage previously defined voice prompts, in accordance with an embodiment of the invention. As shown in FIG. 13, the subscriber is provided at 1302 with voice prompt names for previously defined/created voice prompts. Information regarding distributed text for each voice prompt is provided at 1304, where distributed text is text-to-speech information that has been downloaded to the text-to-speech server (i.e., that may be provided as part of the IVR 134 or the IVR speech server 206). The subscriber is further provided with information regarding new text for a prompt at 1306, for example, where the subscriber wishes to change their prompt. The subscriber is further provided with information at 1308 regarding a recording status for the particular voice prompts. In addition, a distribution status for the voice prompts is provided at 1310, for example, indicating that a prompt has been distributed to the IVR, for example, the IVR 134, for use, as well as a type of voice prompt indication at 1312, indicating, for example, whether the voice prompt is a text-to-speech prompt, or an uploaded .WAV file. The subscriber may further search for a particular prompt that has been previously created, given the name of the prompt at 1314. In addition, the subscriber may further edit a particular voice prompt, for example, by selecting the voice prompt name for the particular prompt to be edited. FIG. 14 illustrates an exemplary subscriber GUI 1400 allowing a subscriber to edit previously defined voice prompts, in accordance with an embodiment of the invention.

As shown in FIG. 14, the subscriber is provided information regarding the voice prompt name selected for editing at 1402, the distributed voice prompt text for the prompt at 1404, and capabilities for changing the text associated with the voice prompt at 1406. Further, the subscriber may alter the voice prompt type at 1408, and is further provided with information regarding the particular subscriber services (i.e. call transfer service) with which the prompt is used at 1410, as well as information regarding the recording status at 1412, distribution status at 1414, and date of distribution of the prompt at 1416. A subscriber may in addition, select to remove the prompt altogether at 1418. Upon selecting the 'next' link, the subscriber may be provided, for example, with general information regarding the updated prompt (not shown).

The information received regarding the voice prompts via the subscriber GUIs of FIGS. 12-14 may be stored by the application engine 202 in a database file for the voice prompts, for example, using database fields corresponding to the information fields of the subscriber GUIs of FIGS. 12-14. Similarly, information may be retrieved from the database file to populate the various voice prompt information fields discussed with respect to FIGS. 12-14, where the application engine 202 accesses the database file for the respective voice prompt information, in a similar fashion as discussed above.

Providing one or more subscriber graphic user interfaces, for example, any of the subscriber GUIs discussed above, through which call transfer service information may be provided allows subscribers to create or modify a call transfer service subscription without the intervention of telephone company personnel. A subscriber may then create or modify the call transfer service subscription at any time of the day. Further, the call transfer service subscription may be created or edited in real-time, or nearly real-time, as it is not necessary to wait for service to be created or modified by the telephone company personnel. In addition, the subscriber has the flexibility of defining particular signals, typically 1 or 2 DTMF sequences, to use for various attention, function and extension/speed dial codes, rather than being limited to a standardized command code convention.

A subscriber GUI 170 may be provided for entering call transfer service information using the application engine 202, the memory device 210, the internet 180, and a display 172 of the subscriber PC 174. Specifically, the application engine 202 may receive a request from a subscriber of the call transfer service to access a subscriber GUI 170. The application engine 202 may request from the subscriber authentication information, such as a user name and password, to ensure the subscriber has access privileges to alter a call transfer service subscription. Upon receiving authentication information, the application engine 202 may access the memory device 210 for information regarding the subscriber's call transfer service subscription. Such information may include information regarding various attention, command and/or extension/ speed dial codes. The information may further, or in the alternative, include information such as user selectable parameters allowing the subscriber to control how the application engine 202 handles call transfer service parameters, such as the attention, command and extension or speed dial definitions, what prompts mentioned above to play to an agent or calling party, when to play the prompts, and how a caller placed on hold is handled. The application engine 202 then provides the retrieved information from the memory device 210 through the internet 180 as a subscriber GUI 170 at the display 172 of the subscriber PC 174. Such a subscriber GUI 170 is provided, for example, as an internet web page, such as is shown in FIGS. 3-5, 8-10 and 12-14.

Call transfer service information may then be received at the platform 130 from the subscriber GUI 170, and is used to update a subscriber's call transfer service subscription. This may be accomplished, where the application engine 202 determines information entered at various fields of the subscriber GUI 170, for example, information fields shown in FIGS. 3-5, 8-10 and 12-14, including information received via an uploaded file as discussed with respect to FIGS. 10, 13 and 14, and stores the information regarding the subscriber's call transfer subscription at the memory device 210. The information may be stored in the form of one or more database files, from which the application engine 202 may retrieve the information when providing the subscriber GUIs, or for use in providing the call transfer service.

As would be appreciated by one skilled in the art, the call transfer service information may be maintained in various database fields of a database file stored at the memory device 210. A database file may include database fields associated with the defined attention key and defined commands, where the respective 1 or more DTMF key sequences for initiating the attention key or call transfer service commands are stored in database fields corresponding to the respective attention key or command. Information regarding which database prompts to play in various circumstances, as well as how a caller is handled in various circumstances (i.e. placed on hold with music, placed on hold with silence, etc. . . . ) may also be maintained in the database. In addition, the database file, or a separate database file, may be maintained regarding a particular extension or speed dial code(s) that may be defined by the subscriber, with corresponding switch/trunk and/or telephone number information. In the alternative, it will be apparent that the destination information may instead be stored in a tabular format, indexed by DTMF key sequence, such that entry of a 1 or more DTMF sequence may be looked-up in the table, and the appropriate attention key or command being determined, and carried out by the application engine 202.

The application engine 202 is programmed to provide call transfer service information to and receive call transfer service information from the subscriber GUI 170, such as, for example, call transfer service information discussed above, and to store the information in the appropriate field of one or more database files used in providing the call transfer service. In a similar fashion, the application engine 202 is capable of extracting any of the call transfer service information provided as a file uploaded via the subscriber GUI 170 shown in FIG. 1 or 2, and storing the information at the memory device 210 in appropriate database fields for later retrieval and use.

The call transfer service information capable of being provided via the graphic user interfaces of FIGS. 3-5, 8-10 and 12-14 may then be utilized by the application engine 202 of the platform 130 in providing the call transfer service. For example, when a calling party dials a company's telephone number that subscribes to the call transfer service, the call is routed to the platform 130. The platform 130 routes the call to the subscriber telephone number, looping the call through the platform. The platform then listens in on the telephone call for attention, command and/or extension or speed dial signals/ codes that may have been defined by the subscriber, for example, via the subscriber GUIs of FIGS. 3-5, 8-10 and 12-14. Utilization of the call transfer service during a telephone call from a calling party to a primary agent will be discussed with respect to the flowcharts of FIGS. 15-16, in the context of a primary agent such as a switchboard operator having a conversation with a calling party. It will be appreciated that the primary agent may instead be a IVR, capable of providing the various call transfer service attention, function and command entries discussed below.

Figure 15:
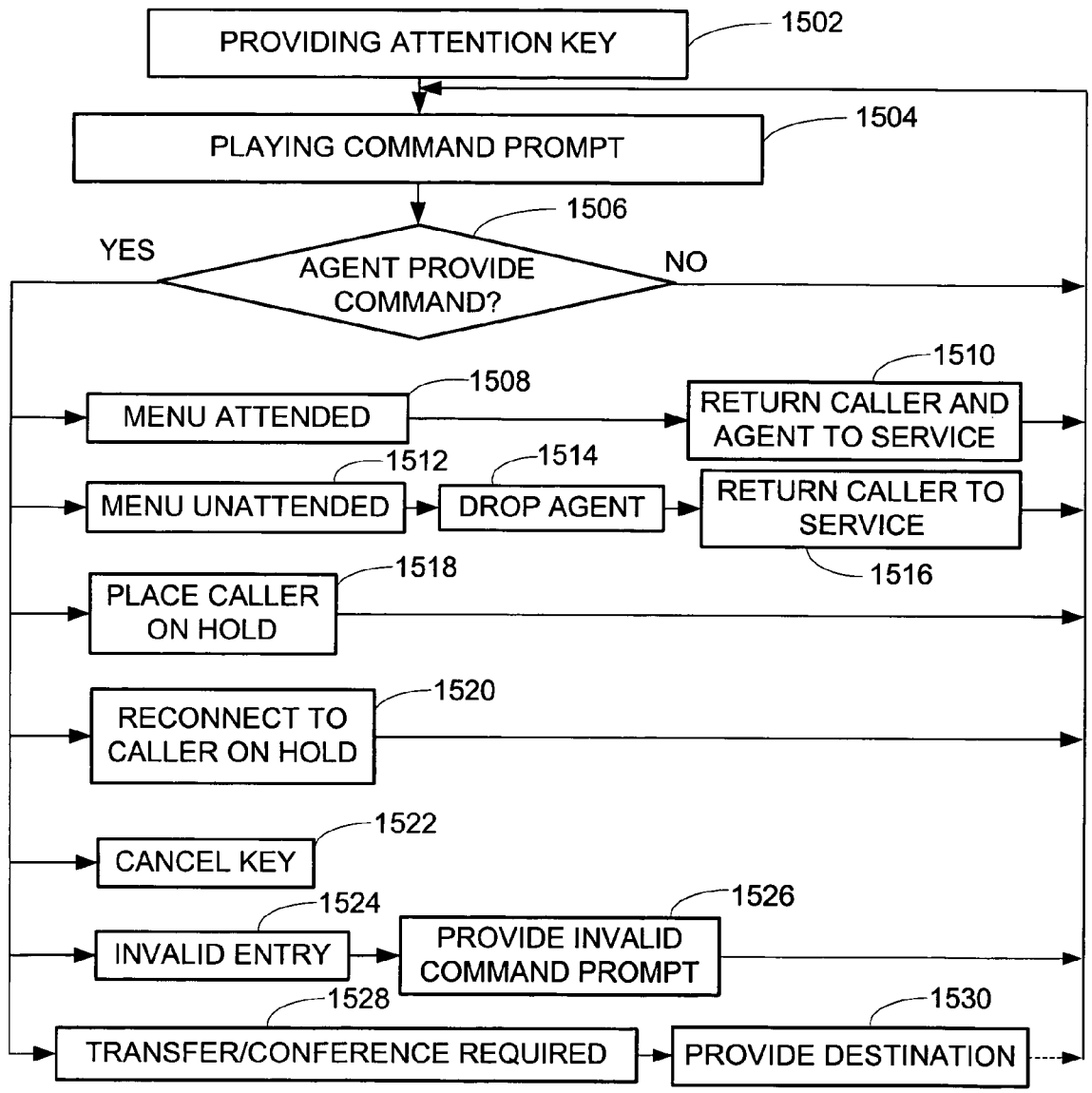
FIGS. 15-16 are flowcharts illustrating utilization of a call transfer service subscription, in accordance with embodiments of the invention.

As shown in the flowchart of FIG. 15, the primary agent provides an attention signal such as the defined DTMF sequence for the attention key 402 at box 1502, when it is desired to access call transfer service functionality during a telephone call. In response to the attention key being entered, the calling party is placed on hold, for example with silence or with music as defined by the caller on hold after attention key selection 408, and a command prompt is provided to the primary agent at 1504. The command prompt may have been selected at 406, and may indicate to the primary agent that the call transfer service system (i.e., the platform 130) is awaiting a call transfer service command signal to be provided by the agent, the command signal being a command that may have been defined using a subscriber GUI discussed herein. Such command signals may be, for example, DTMF sequences such as a cancel key command that may have been defined at 404, or any of the call transfer service commands that may have been defined, shown generally at 410, and 502-516.

It is then determined, for example, by the application engine 202, whether the primary agent has entered a call transfer service command at 1506. Where no command has been entered, flow returns to box 1504 where any defined command prompt continues to be played. Where it is determined that the agent has entered a command at 1506, flow continues responsive to which command was entered. Where a menu again attended command was provided at box 1506, for example, that may have been defined at 418, flow continues to box 1508, and the calling party and primary party are returned to the call transfer service so that both parties can hear any call transfer service menu announcements repeated as shown at box 1510, an flow returns to box 1504. Where a menu again unattended command is provided at 1506, that may have been defined at 416, flow continues to box 1512, where the primary agent is dropped as shown at box 1514, and the caller is returned to the call transfer service as shown at box 1516 so that both parties can hear any call transfer service menu announcements repeated, and flow returns to box 1504.

Where a place caller on hold command was entered at 1506, for example with silence or with music that may have been defined at 506 or 508, flow continues to box 1518, for example, to place the calling party on hold, and to allow the primary agent time to determine how to handle the telephone call, such as by determining where the telephone call from the calling party is to be transferred. Flow then returns to box

1504. Where a reconnect to caller on hold command is provided at box 1506, for example, that may have been defined at 510, flow continues to 1520, where the primary agent may be reconnected with a calling party placed on hold, and to explain to the calling party what action will be taken with the telephone call, and flow returns to box 1504. Where a cancel command is entered at 1506, that may have been defined at cancel command 404, flow continues to box 1522, and it is indicated to the call transfer service, for example, the application engine 202 of the platform 130, that the attention key was inadvertently entered, and the call does not currently require intervention of the call transfer service. In this case, the call may continue and the platform 130 "listens-in" on the telephone call for an attention key entry, at which time flow again begins at box 1502 in a fashion as discussed above.

Where it is determined by the application engine 202 that the command provided at box 1506 is not a defined command, flow may continue to box 1524, and an invalid command prompt may be provided at box 1526, that may have been defined at 530. Flow then returns to box 1504, and continues as discussed above.

Where a command provided at 1506 that indicates a transfer or conference is desired, for example, that may have been defined at 502 or 504, flow continues to box 1528, and a destination signal may be provided to the primary agent as shown at box 1530. The destination signal is one that indicates a telephone number or extension/speed dial code with which the current telephone call is to be conferenced and/or transferred. In some situations, flow may return to box 1504, where a command prompt may be played to the agent indicating additional call transfer commands, for example, commands associated with the conference or transfer functions of the call transfer service, are to be entered. In other circumstances (not shown in FIG. 15), the flow may continue to box 1506, where the agent may directly enter call transfer service commands appropriate during a conference or transfer function. A more detailed flowchart discussing the call transfer service utilization during a transfer or conference command is discussed with respect to the flowchart of FIG. 16, in accordance with an embodiment of the invention.

Figure 16:
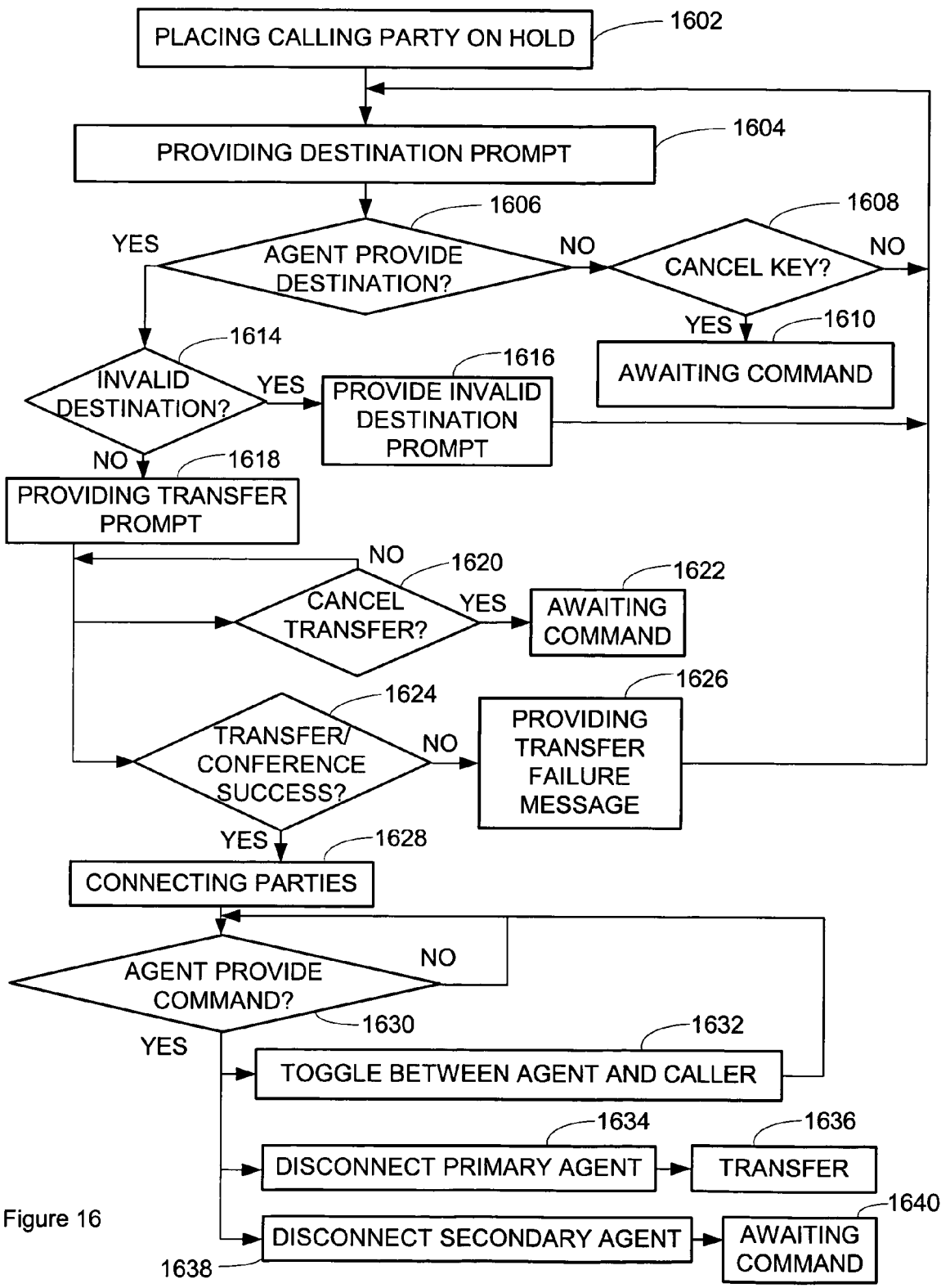

As shown in FIG. 16, upon indication of a transfer or conference command by the primary agent, for example at box 1506, the calling party is placed on hold as shown at box 1602, and a destination prompt is provided to the primary agent at box 1604, indicating that the call transfer service is awaiting a destination telephone number, or extension/speed dial code, with which to transfer or conference the telephone call. Such a destination prompt may be one that was defined at speed dial prompt 804. The extension/speed dial code may be one that has been defined using any of the subscriber GUIs of FIGS. 8-9 or uploaded as part of an extension/speed dial file as shown with respect to FIG. 10.

It may then be determined, for example, by the application engine 202 of the platform 130, whether the agent has provided a destination at block 1606. The destination is a telephone number or extension/speed dial code corresponding to a secondary agent that the primary agent desires to include in the telephone call. Where no destination has been provided, it may be determined at the application engine 202 of the platform 130 whether the cancel key has been entered by the primary agent, as shown at box 1608. Where the cancel key, for example the cancel key defined at 404, has been provided at 1608, flow continues to box 1610, where additional call service commands are awaited. This may be accomplished, for example, by the flow returning to box 1504 of FIG. 15, where a command prompt is provided to the primary agent indicating that the call transfer service is awaiting a command, as discussed above. Where it is determined that no cancel key is entered at 1608, flow returns to box 1604.

Where the agent has provided a destination at box 1606, it may be determined by the application engine 202 at box 1614 whether the destination is an invalid destination. For example, the application engine 202 may accomplish this by determining the number of digits entered, such as whether the number of digits constitutes a length for a valid telephone number or extension/speed dial code, and if the number is one that is a proper length for a extension/speed dial code, whether the extension/speed dial code matches one that has been stored at the memory device 210 for the particular call transfer service subscription. Where the destination is invalid at box 1614, an invalid destination prompt is provided at box 1616, that may have been defined at invalid speed dial code prompt 806. Flow then returns to box 1604. If however, the destination is determined not to be invalid at box 1614, a transfer prompt indicating that a transfer is commencing may be provided at box 1618.

At this point, the application engine 202 may be open to accept commands and/or determining whether the transfer/conference was successful. For example, where the application engine 202 detects that a cancel transfer has been requested at box 1620, for example that may have been defined at the transfer interrupt key 808, flow may continue to box 1622, where a call service command is awaited, in a similar fashion as discussed above with respect to box 1610. It may further be determined by the application engine 202 at box 1624 whether the transfer/conference is successful. For example, where the telephone number entered, or the destination/telephone number corresponding to the extension/speed dial code are invalid, and thus one that the platform 130, for example the platform switch 132, is unable to connect with, it may be determined that the transfer is not successful. Further, if destination number of the transfer or desired conference is busy, or not answered within some predetermined number of rings (i.e., 8), then it may be determined at box 1624 that the transfer is not successful. However, where the attempt to transfer/conference is answered, it may be determined at box 1624 that the transfer/conference is successful. Where it is determined at box 1624 that the transfer is not successful, a transfer failure message may be provided as shown at box 1626, and flow may return to box 1604. The transfer failure message may be one that has been defined at transfer failure message 810. Where the transfer is determined to be successful at box 1624, flow continues to box 1628, where the parties are connected.

At this point, the primary agent may provide additional commands, pertinent to the transfer/conference. It may be determined by the application engine 202 whether the primary agent has provided additional commands, as shown at box 1630. Where a Toggle between agent and calling party command has been entered, flow continues to box 1632 allowing the toggle, where the toggle may have been defined at toggle between caller and secondary agent command 516. Such a toggle allows the primary agent to converse with one or the other of the calling party and the party at the destination (secondary agent), while the other party remains on hold. The primary agent may further provide a disconnect primary agent command at box 1630, where flow continues to box 1634. In this case the primary agent is disconnected at box 1634, and a transfer of the telephone call is commenced to the secondary agent at 1636. The disconnect primary agent command may have been defined at disconnect primary agent 512. The primary agent is no longer involved in the telephone call. The primary agent may further provide a disconnect secondary agent command, where flow continues to box

1638. In this case the secondary agent is disconnected from the telephone call at box 1638, and flow may continue to box 1640, where a call transfer service command is awaited, in a similar fashion as discussed above with respect to box 1610.

An exemplary operation of the telephone network of FIG. 1 in providing a call transfer service that has been created or modified using a subscriber GUI, will now be discussed with respect to the flowchart of FIG. 17, in accordance with an embodiment of the invention. Operation of the telephone network will be discussed in the context where a calling party, for example the calling party 104, dials a telephone number of a primary agent for a company at a network location 106, and the company telephone number may be, for example, a toll-free telephone number for the company. Further, the company is a subscriber of the call transfer service, where the company has capabilities for altering their call transfer service subscription using one or more subscriber GUIs, as discussed above. The primary agent at the network location 106 may utilize the call transfer service to conference and/or transfer the calling party 104 with a secondary agent, for example the secondary agent located at the network location 108.

Figure 17:
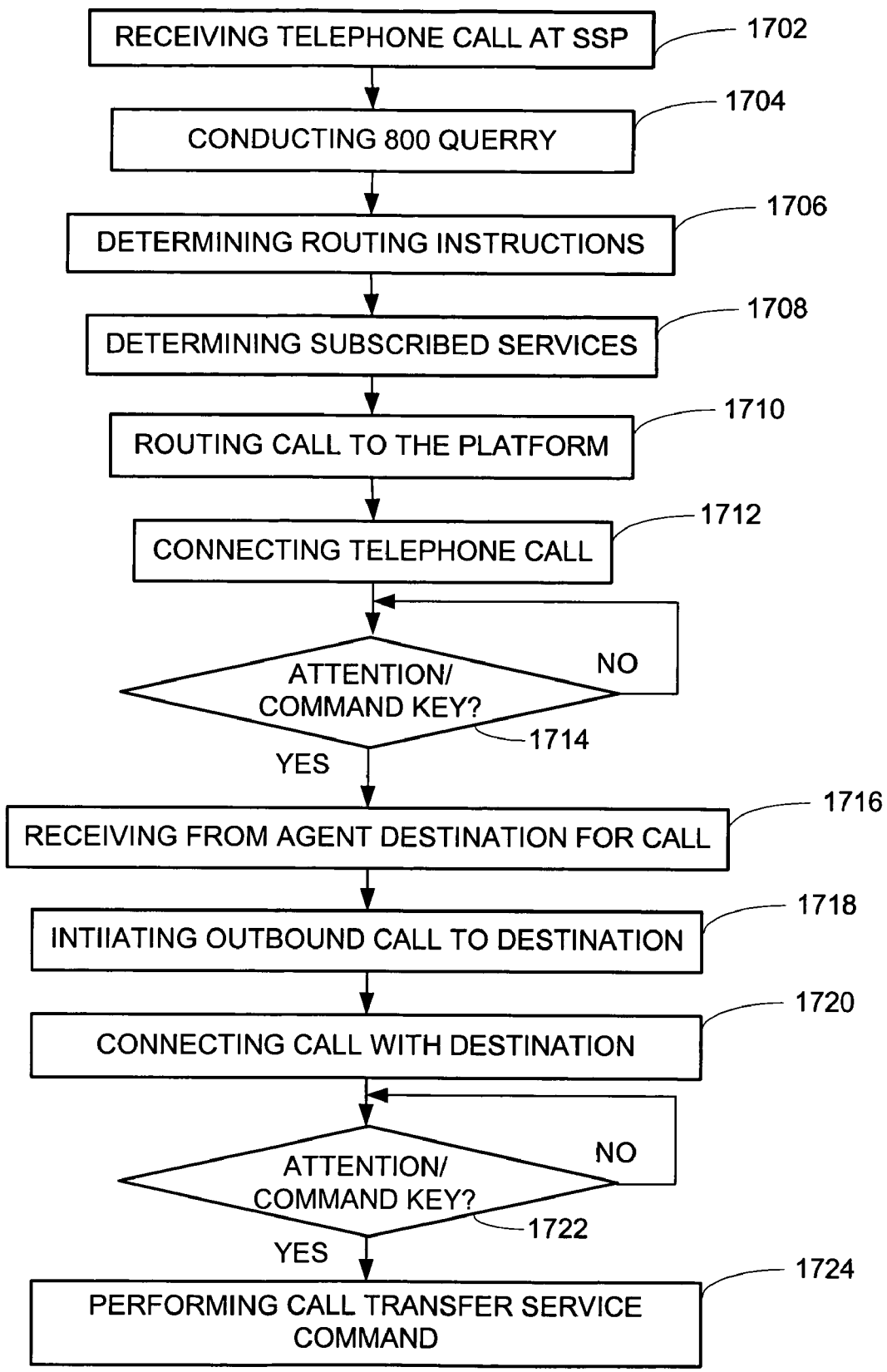
FIG. 17 is a flowchart illustrating operation of a call transfer service over a telephone network, in accordance with an embodiment of the invention.

As shown in the flowchart of FIG. 17, the SSP 110 receives 1702 the calling party telephone call to the company toll-free telephone number, and performs an 800 query to a local service control point (SCP) 120, as shown at 1704, to receive routing instructions, for example, utilizing the SS7 communications protocol. The SS7 communication protocol is well-known, and is discussed in greater detail in U.S. Pat. No. 6,097,802 to Fleischer, III et al., assigned to SBC Technology Resource Group, Inc., and hereby incorporated by reference herein.

The SCP 120 returns a route response message to the SSP 110, using the SS7 communications protocol. Routing instructions are received at the SSP 110 at 1706 via the route response message, that indicates to the SSP 110 that the telephone call is to be routed to a portion of the telephone network servicing the toll-free telephone number, for example, the SSP 112. The routing message may include a carrier identifier, as is appreciated by one skilled in the art.

The SSP 112 receives the telephone call from the calling party, and is capable of determining services subscribed to by the company at 1708. This may be determined by the SSP 112 determining an appropriate SCP, here the SCP 122, for determining services (i.e. the call transfer service) to which the company toll-free number is linked. The services are determined by the SSP 112 querying the SCP 122 for services linked to the company telephone number. Here, the SCP 122 determines that the company toll-free telephone number is a subscriber of the call transfer service, and returns an SS7 Analyze Route Message to route the telephone call to the switch and trunk group serving the platform 130.

The calling party telephone call is routed to the platform 130 as shown at 1710. The telephone call is connected as shown at 1712. This may be accomplished, for example, where the platform 130 receives an SS7 initial address message (IAM) at the platform switch 132, to set up the call. The call may be routed to the interactive voice response (IVR) application menu provided by the IVR 134, based on the outpulse digits (i.e. dialed 800 toll free number). The caller may interact with the IVR application menu using DTMF input. Based on the caller's DTMF input the IVR application may, using the platform switch 132, initiate an outbound call to a pre-defined destination number. The application may send an SS7 IAM to a particular portion of the telephone network to initiate the call setup to the destination number, for example, the SSP 112. The platform 130, and specifically the platform switch 132, waits for an SS7 Answer Message (ANM) to indicate that the call has been answered. The IVR application bridges the caller and contact center agent at the company telephone number (i.e., the primary agent) together through the platform 130. It will be appreciated that, in the alternative, the call may be connected at 1712 without IVR intervention, as the calling party may be connected and/or transferred by the platform switch 132 directly to the primary agent at the company location, where the call is looped through the platform 130.

While the caller and primary agent converse, the platform 130 (i.e., specifically the application engine 202) listens for an attention key or command (i.e. DTMF key or sequence) to be entered by the primary agent, as shown at box 1714. Where no attention key is provided, flow continues at 1714, where the platform 130 continues to listen for the attention key. For example, the agent may enter a command code for a Warm Transfer Conference transfer request. Once the platform detects the Attention Key (i.e., a "*" or "#" DTMF key), it automatically places the caller on hold, and may perform any of the defined commands that have been discussed above with respect to FIGS. 15-16. Where the primary agent provided a command to initiate a transfer or conference, the primary agent enters the extension or destination number for use in establishing the conference call, that is received at the platform 130, as shown at box 1716.

An outbound call is initiated as shown at box 1718, for example by the platform switch 132, to the destination number of the secondary agent (i.e. the secondary agent 108, corresponding to the extension or destination number entered by the primary agent). The platform switch 132 may accomplish this by sending an SS7 IAM to the portion of the telephone network servicing the destination number to initiate the call setup to the secondary agent, and waits for an SS7 ANM message. Once an SS7 ANM message is received, the call is connected with the secondary agent as shown at box 1720, and the platform 130 bridges all parties together. When all parties are bridged together, the caller may be taken off of hold.

The IVR (or application engine 202) may then listen for entry of the attention key, as shown at box 1722, while the parties hold a conference. The IVR or application engine 202 listens for attention key and commands from the primary agent, for example, commands that have been discussed above with respect to FIGS. 15-16. Where a command key sequence has been entered, the application engine 202 carries-out the command as shown at box 1724, for example, in a similar fashion as discussed above with respect to FIGS. 15-16. If either of the agents are dropped from the call (i.e., via the drop primary or drop secondary agent commands discussed above) the remaining agent may gain control of the call and enter further call transfer service commands.

The various database file formats discussed above are exemplary, and one skilled in the art would realize that any number of database entries may be provided for each of the respective database files. Further, although multiple database files are described, one skilled will appreciate that the information stored in the various databases may be maintained in a single database file, or any other number of database files, so long as the application engine 202 is programmed with information regarding from which database(s) to retrieve the various information stored. Further, although the information is described as being stored in the form of one or more database files at the memory device 210, one skilled will realize that the information may be stored in other formats, so long as the application engine 202 is sufficiently programmed for retrieving the data.

Although the system diagram of FIG. 1 describes the connection between the subscriber GUI 170 and the platform 130 as an Internet connection, one skilled will appreciate that other connection schemes are possible. For example, the subscriber GUI may be provided via a peer to peer connection between the subscriber PC 174 and the platform 130, for example, via dedicated dial-up telephone number. Such a telephone number may support any communications format capable of allowing the platform to receive information from, and provide information to, the scriber GUI 170. Such communication between the subscriber PC 174 and the platform 130 may be made using broadband communication capabilities over the phone line, for example, any xDSL service such as ADSL, VDSL, and HDSL. The broadband service may include any other type of broadband service that may operate using any frequency band over the telephone subscriber twisted wire pair.

The subscriber GUIs 170 discussed herein may be completely provided to the subscriber by the platform 130 via the communication channel between the subscriber and the platform. In the alternative, the subscriber may be provided with subscriber GUI software defining multiple subscriber GUIs, such that the platform need only send the information to populate the various information fields to provide call transfer service specific information to the subscriber, and retrieve the information entered into the various information fields by the subscriber. Any combination of the former and the latter may be implemented.

The platform 130 has been discussed as being implemented in a telephone network having AIN capabilities. One skilled in the art will realize that the telephone network need not have AIN capabilities for the platform to function, so long as any of the SSPs within the telephone network are capable of routing a telephone call from the calling party to a call transfer service subscriber to a platform capable of providing the call transfer service. Further, it will be apparent, that although the platform has been described as being a separate network entity, the functionality described with respect to the platform may be incorporated in other telephone network components, for example, an SCP or SSP of the telephone network, while achieving the advantages discussed herein.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for providing a call transfer service implemented over a telephone network, a subscription for the call transfer service being alterable by a call transfer service subscriber, the system comprising:
   a telephone network node, configured to communicate with a subscriber graphic user interface, the node including:
      a memory device that stores call transfer service information received from the subscriber via the subscriber graphic user interface for use in implementing the call transfer service, and
      a call transfer service controller coupled with the memory device, that communicates with the subscriber graphic user interface, and that receives the call transfer service information, and updates the subscriber's call transfer service subscription responsive to information received at the subscriber graphic user interface wherein the call transfer service information includes information associating an attention signal with a subscriber defined attention key, wherein the attention signal invokes the call transfer service; and
   a switch configured to interface with an external service switching point to receive incoming telephone calls from a calling party and further configured to initiate transfer of the incoming call to an additional telephone number.

2. The system of claim 1, wherein the call transfer service information further includes at least one of a cancel signal and a function signal.

3. The system of claim 2, wherein the call transfer service information includes a destination signal defined using the subscriber graphic user interface, where the function signal describes the relationship between a telephone call from a calling party and the destination signal.

4. The system of claim 3, wherein the destination signal is a telephone number to which the telephone call is linked by the telephone network.

5. The system of claim 3, wherein the destination signal is at least one of a speed dial code and an extension code corresponding to a telephone number to which the incoming call is linked by the telephone network.

6. The system of claim 5, wherein the at least one speed dial code and extension code is defined in a computer file that may be uploaded using the subscriber graphic user interface.

7. The system of claim 5, wherein the at least one speed dial code and extension code includes at least one of switch identification information, trunk identification information, and destination information.

8. The system of claim 3, wherein the call transfer service information includes prompt information, for providing information during use of the call transfer service.

9. The system of claim 2, wherein the function signal definition includes at least one of menu again attended, menu again unattended, warm transfer consult, warm transfer conference, on hold with silence, on hold with music, reconnect to caller on hold, disconnect primary agent, disconnect secondary agent, and toggle caller and secondary agent function signal definitions.

10. The system of claim 2, wherein the attention signal and the function signal are each comprised of at least one DTMF tone that corresponds to at least one key on a telephone handset.

11. A method for implementing a call transfer service provided over a telephone network, a subscription for the call transfer service being alterable by a call transfer service subscriber, the method comprising:
    providing, by a server in a call transform service platform, a subscriber graphic user interface through which the subscriber may provide call transfer service information; and
    receiving the call transfer service information from the subscriber graphic user interface at a node of the telephone network used in the providing of the call transfer service, the node capable of updating the subscriber call transfer service subscription responsive to the received information;
    wherein the call transfer service information includes information associating an attention signal with a subscriber defined attention key, wherein the attention signal is used to invoke the call transfer service.

12. The method of claim 11, wherein the call transfer service information further includes at least one of a cancel signal and a function signal definition.

13. The method of claim 12, wherein the call transfer service information includes a destination signal, where the function signal describes the relationship between an incoming call from a calling party and the destination signal.

14. The method of claim 13, wherein the destination signal includes a telephone number to which the incoming call is linked by the telephone network.

15. The method of claim 13, wherein the destination signal includes at least one of a speed dial code and an extension code definition corresponding to a telephone number to which the incoming call is linked by the telephone network.

16. The method of claim 15, wherein the destination signal includes at least one speed dial code and extension code defined in a computer file accessible via the subscriber graphic user interface.

17. The method of claim 15, wherein the at least one speed dial code and extension code include at least one of switch identification information, trunk identification information, and destination information.

18. The method of claim 13, wherein the call transfer service information includes prompt information, for providing information during use of the call transfer service.

19. The method of claim 12, wherein the function signal definition includes at least one of a menu again attended, menu again unattended, warm transfer consult, warm transfer conference, on hold with silence, on hold with music, reconnect to caller on hold, disconnect primary agent, disconnect secondary agent, and toggle caller and secondary agent function signal definition.

20. The method of claim 12, wherein at least one of the attention signal, cancel signal and function signal definitions defines at least one of the attention signal, cancel signal and function signal as at least one DTMF tone definition that corresponds to at least one key on a telephone handset.

21. The method of claim 11, further comprising saving the received call transfer service information at a memory device at the telephone network node.

22. A telephone network for implementing a subscriber alterable call transfer service, the call transfer service associated with a telephone number of a call transfer service subscriber, the telephone network comprising:
    a telephone network node through which an incoming call to the telephone number is routed, and including
        a controller configured to provide a subscriber GUI through which a subscriber may provide call transfer service information including information associating an attention signal with a subscriber defined attention key, wherein the attention signal is used to invoke the call transfer service, to update the subscriber call transfer service subscription responsive to the call transfer service information, and to detect an attention signal and a function signal during the incoming call, the attention signal indicating to the telephone network that an action needs to be performed with the incoming call, and the function signal corresponding to the action, and
        a memory device coupled with the controller, for storing relationships between function signals and corresponding actions to be performed.

23. The telephone network of claim 22, wherein the call transfer service information further includes at least one of a cancel signal and a function signal.

24. The telephone network of claim 23, wherein the call transfer service information further includes a destination signal definition, the function signal describing the relationship between an incoming call from a calling party and the destination signal.

25. A method for editing a call transfer service subscription, the method comprising:
    providing, by a server in a call transfer service platform, a subscriber graphic user interface through which a subscriber may provide call transfer service information, wherein the call transfer service information includes information associating an attention signal with a subscriber defined attention key, wherein the attention signal is used to invoke a call transfer service; and
    receiving information from the subscriber graphic user interface at a node of the telephone network, the node capable of updating the subscriber call transfer service subscription responsive to the received information.

26. A non-transitory computer readable storage media comprising instructions, embedded in the media, for use in implementing a call transfer service provided over a telephone network, a subscription for the call transfer service being alterable by a call transfer service subscriber, the instructions comprising instructions for:
    enabling a user to invoke a subscriber graphic user interface through which the user may provide call transfer service information including information associating an attention signal with a subscriber defined attention key, wherein the attention signal is used to invoke the call transfer service; and
    receiving information from the subscriber graphic user interface at a node of the telephone network, the node capable of updating the subscriber call transfer service subscription responsive to the received information.

27. The computer readable storage media of claim 26, wherein said instructions for enabling the user to invoke a subscriber graphic user interface further include instructions for providing at least one of a cancel signal and a function signal.

28. The computer readable storage media of claim 27, wherein the instructions for enabling the user to invoke a subscriber graphic user interface further include instructions enabling the subscriber to provide a destination signal, where the function signal describes the relationship between an incoming call from a calling party and the destination signal.

* * * * *